(12) United States Patent
Daulton

(10) Patent No.: US 10,944,893 B1
(45) Date of Patent: Mar. 9, 2021

(54) TRANSFERABLE MINI-CAMERA DEVICE

(71) Applicant: Brian Anthony Daulton, Coalinga, CA (US)

(72) Inventor: Brian Anthony Daulton, Coalinga, CA (US)

(73) Assignee: Brian Anthony Daulton, Coalinga, CA (US)

( * ) Notice: Subject to any disclaimer, the term of this patent is extended or adjusted under 35 U.S.C. 154(b) by 0 days.

(21) Appl. No.: 16/915,689

(22) Filed: Jun. 29, 2020

(51) Int. Cl.
  *H04N 5/225* (2006.01)
  *H04N 5/232* (2006.01)
  *H04W 12/00* (2021.01)
  *G02B 13/00* (2006.01)

(52) U.S. Cl.
  CPC ..... *H04N 5/225251* (2018.08); *G02B 13/009* (2013.01); *H04N 5/2257* (2013.01); *H04N 5/23296* (2013.01); *H04W 12/003* (2019.01)

(58) Field of Classification Search
  CPC ........ H04N 5/225; H04N 5/232; G02B 13/00; H04W 12/00
  USPC ........................................... 348/14.01–14.16
  See application file for complete search history.

(56) References Cited

U.S. PATENT DOCUMENTS

| | | | |
|---|---|---|---|
| 10,171,719 B1* | 1/2019 | Fitzgerald | A42B 1/24 |
| 2004/0227850 A1* | 11/2004 | Chiang | H04N 5/2251 348/375 |
| 2015/0133051 A1* | 5/2015 | Jamal-Syed | H04W 4/21 455/41.2 |
| 2017/0369164 A1* | 12/2017 | Klein | B64C 39/024 |
| 2018/0071610 A1* | 3/2018 | Miller | A63B 71/0622 |
| 2018/0077272 A1* | 3/2018 | Sainvil | H04N 5/2253 |
| 2019/0124290 A1* | 4/2019 | Yuan | H04N 5/63 |
| 2019/0250677 A1* | 8/2019 | Dilaura | G03B 17/04 |

* cited by examiner

*Primary Examiner* — Melur Ramakrishnaiah
(74) *Attorney, Agent, or Firm* — Procopio, Cory, Hargreaves & Savitch LLP

(57) ABSTRACT

Transferable mini-camera for a plurality of devices. In an embodiment, the mini-camera comprises a connector configured to attach to a socket and detach from the socket on a plurality of devices, a rechargeable battery configured to charge from each of the plurality of devices when the connector is attached to the socket of that device, a wireless transceiver configured to wirelessly communicate with a first device when the connector is detached from the socket of the first device, a camera configured to capture image data, and at least one processor. The at least one processor is configured to wirelessly transmit image data, captured by the camera, to the first device via the wireless transceiver, while the connector is attached to the socket of a second device and not the socket of the first device.

18 Claims, 12 Drawing Sheets

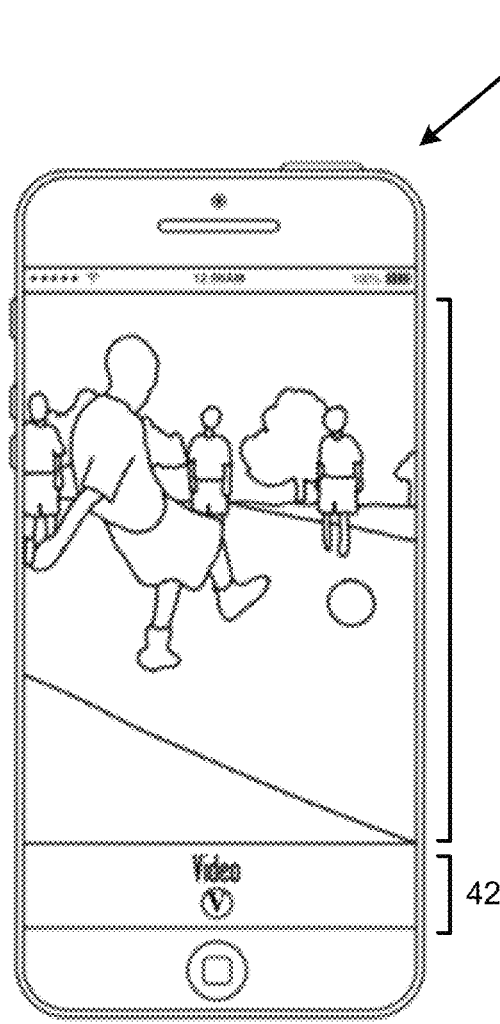 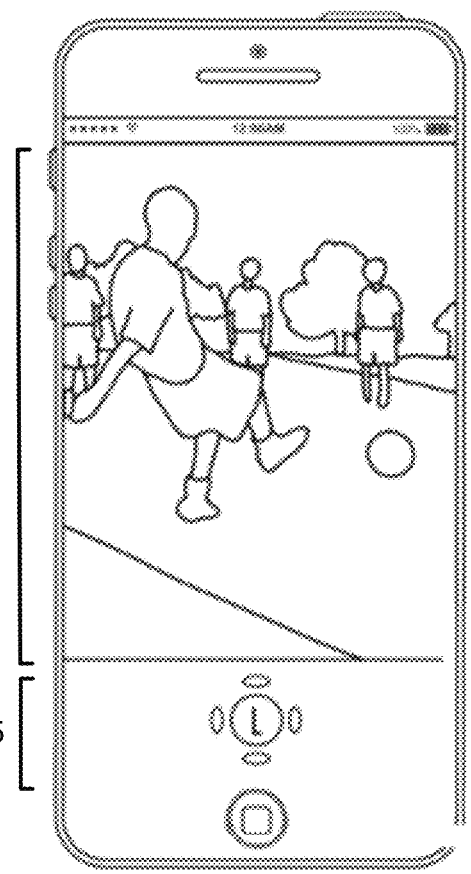
FIG. 4C                    FIG. 4D

FIG. 8A
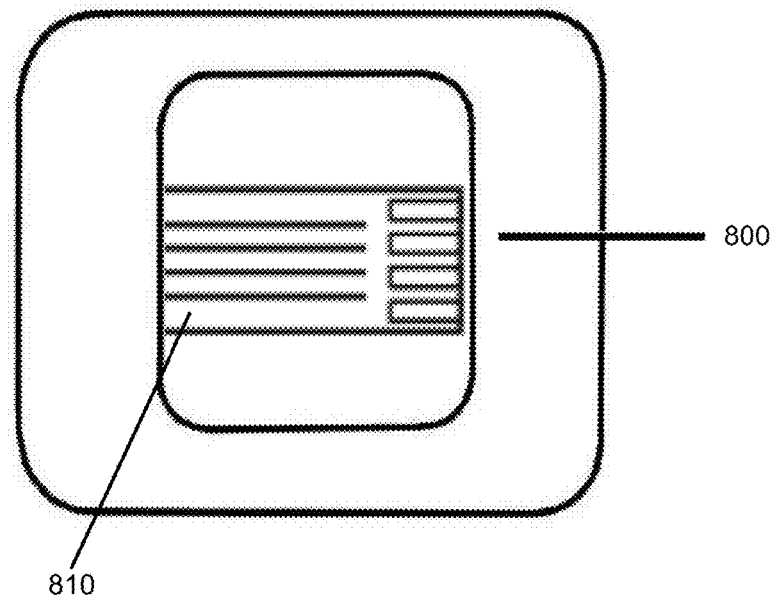
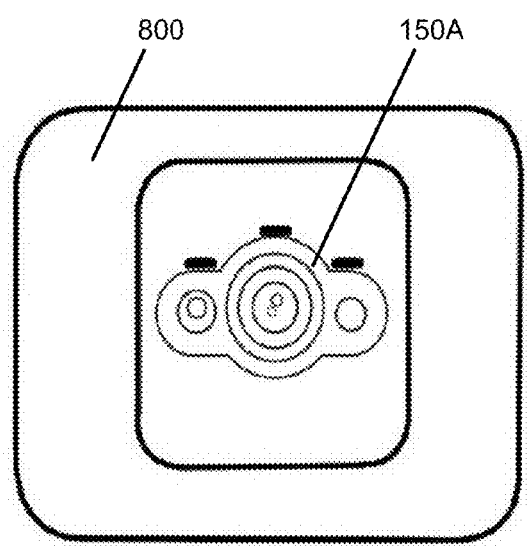
FIG. 8B
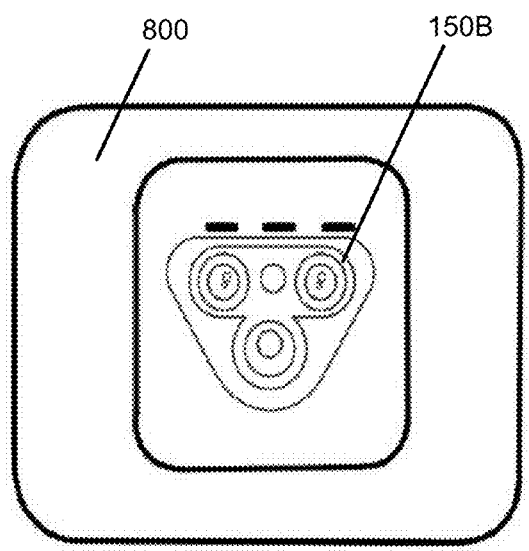
FIG. 8C

TRANSFERABLE MINI-CAMERA DEVICE

CROSS-REFERENCE TO RELATED APPLICATIONS

This application is related to U.S. patent application Ser. No. 16/702,220, filed on Dec. 3, 2019, which is a continuation of U.S. patent application Ser. No. 16/194,042, filed on Nov. 16, 2018, which claims priority to U.S. Provisional Patent App. No. 62/608,788, filed on Dec. 21, 2017, which are all hereby incorporated herein by reference as if set forth in full.

BACKGROUND

Field of the Invention

The embodiments described herein are generally directed to a camera, and, more particularly, to an integrated mini-camera device that can be detached from and attached to the main bodies of a plurality of larger devices, such as smartphones, tablet computers, or other mobile computing devices, action cameras, and/or the like.

Description of the Related Art

Many, if not most, mobile devices these days are outfitted with one or more built-in or embedded cameras. Examples of such mobile devices include, without limitation, cellular or other wireless telephones (e.g., smartphones), tablet personal computers (PCs), laptop PCs, wearable devices (e.g., smart watches) and any other type of mobile (e.g., wireless) user equipment. Typically, the built-in camera is a small-complementary-metal-oxide-semiconductor (CMOS) based or charge-coupled-device (CCD) based image sensor that comprises associated control components and electronics.

A user of the mobile device can use the built-in camera to capture high-resolution digital photographs and videos, similarly to a traditional digital camera. For a rear-facing camera in which the components (e.g., camera, flash, and sensor) are on the rear side of the mobile device, the user typically faces the rear side of the mobile device towards the object of interest and actuates a control on the mobile device (e.g., virtual button within a graphical user interface displayed on a front display of the mobile device, hard key on the front or side of the mobile device, etc.) to capture a photograph or video of the object. The mobile device then stores the photograph or video as a digital image file (e.g., a Joint Photographic Experts Group (JPEG) file) in a memory of the mobile device.

Generally, the user can utilize software on the mobile device to organize, edit, transmit, and/or share the captured digital photograph or video files. For example, the digital file may be transmitted via a wireless communications network (e.g., cellular network, Wi-Fi™ network, etc.) to a cloud-computing service, to another device (e.g., associated with another user or the same user), and/or the like. In the case of a video, the user may conduct a video conference (e.g., via FaceTime™, Skype™, or other application). Alternatively, the user may live-stream a video to an online service (e.g., social media platform, such as Facebook™) via the wireless communication network. Other users may then view the live-stream of the video via a data connection with the online service. As another alternative, one user could live-stream a video directly from his or her mobile device to another user's device.

Since the inception of the camera phone, users have become increasingly comfortable using the built-in cameras of their mobile devices as a primary camera for photographs and video, in place of traditional stand-alone handheld cameras. Thus, manufacturers have begun designing their mobile devices to enhance the quality, usability, and functionality of the built-in cameras. However, built-in cameras remain difficult to use in conjunction with other functions of the mobile devices.

For example, when the need arises to use the built-in camera to capture a photograph or video while a user is engaged in a telephone conversation using the mobile device, the user must generally interrupt the telephone conversation to position the mobile device for the capture. Specifically, the user may need to switch the telephone conversation to speakerphone, in order to enable appropriate positioning of the mobile device for photograph or video capture. In addition, the user must maintain the mobile device within a comfortable range of the user's ears and mouth, in order to continue the telephone conversation while attempting to capture a photograph or video. It also results in a loss of privacy, since both sides of the conversation may be heard by passerby's. In addition, the user may need to navigate to a camera function of the mobile device (e.g., using a touch panel display of the mobile device) in order to initiate the capture of the photograph or video.

What is needed is an integrated but detachable mini-camera that can be detached from the main body of a mobile device and used to capture photographs and video without regard for the orientation of the main body. Ideally, the mini-camera could be reattached to the main body of the mobile device for recharging and compact, integrated storage of the mini-camera, and even more ideally, could be transferred between a plurality of different devices and types of devices as needed or desired.

SUMMARY

Accordingly, a mini-camera is disclosed that is capable of quick and easy undocking and docking with a plurality of mobile devices. In an embodiment, an image-capture device comprises: a connector configured to attach to a socket and detach from the socket on a plurality of devices, wherein the plurality of devices comprises a first device and a second device; a rechargeable battery configured to charge from each of the plurality of devices when the connector is attached to the socket of that device; a wireless transceiver configured to wirelessly communicate with the first device when the connector is detached from the socket of the first device; a camera configured to capture image data; and at least one processor that is configured to wirelessly transmit image data, captured by the camera, to the first device via the wireless transceiver, while the connector is attached to the socket of the second device and not the socket of the first device. The first device and/or second device may be a mobile device. For example, the first device may be a smartphone, and the second device may be a tablet computer or action camera.

In an embodiment, a system comprises: the image-capture device; and the second device, wherein the second device comprises a housing that is configured to be mounted on a third-party apparatus, and wherein the second device does not comprise a camera. The second device may comprise another rechargeable battery, which is configured to charge the rechargeable battery of the image-capture device when the connector of the image-capture device is attached to the socket of the second device. The third-party apparatus may be a helmet or recreational vehicle.

The image-capture device may comprise: a housing that holds the connector, the rechargeable battery, the wireless transceiver, the camera, and the at least one processor; and one or more hardware keys on an exterior surface of the housing, wherein each of the one or more hardware keys is associated with a function. A first one of the one or more hardware keys, when actuated, may toggle the capture of the image data by the camera between on and off states. The one or more hardware keys may be a plurality of hardware keys. A second one of the plurality of hardware keys, when actuated, may control a zoom level of the camera. The second hardware key, when actuated, may increase the zoom level of the camera, and a third one of the plurality of hardware keys, when actuated, may decrease the zoom level of the camera.

In an embodiment, the at least one processor is configured to automatically pair to each of the plurality of devices when the connector is attached to the socket of that device. A system may comprise: the image-capture device; and the second device, wherein the second device comprises a sensor that detects when the connector of the image-capture device is attached to the socket of the second device, and at least one processor that is configured to automatically initiate pairing of the image-capture device to the second device when the sensor detects that the connector of the image-capture device is attached to the socket of the second device. The second device may further comprise a display, wherein initiating pairing comprises prompting a user to confirm the pairing via a graphical user interface on the display of the second device. Pairing may comprise establishing a communication connection between the image-capture device and the second device, such that one or more functions of the image-capture device can be controlled via a mobile application being executed by the at least one processor of the second device. Pairing may comprise establishing a communication connection between the image-capture device and the second device, such that image data, captured by the camera of the image-capture device, can be sent to a mobile application being executed by the at least one processor of the second device.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 4A-4H illustrate various screens of an example graphical user interface of a mobile application for controlling a detachable mini-camera, according to an embodiment;

FIGS. 7A-8C illustrate a transfer of a detachable mini-camera to other devices, according to embodiments.

DETAILED DESCRIPTION

In an embodiment, a mini-camera is disclosed that is capable of quick and easy undocking and docking with a main body of a plurality of different devices and/or different types of devices. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Detachable Mini-Camera

Figures 1A, 1B:
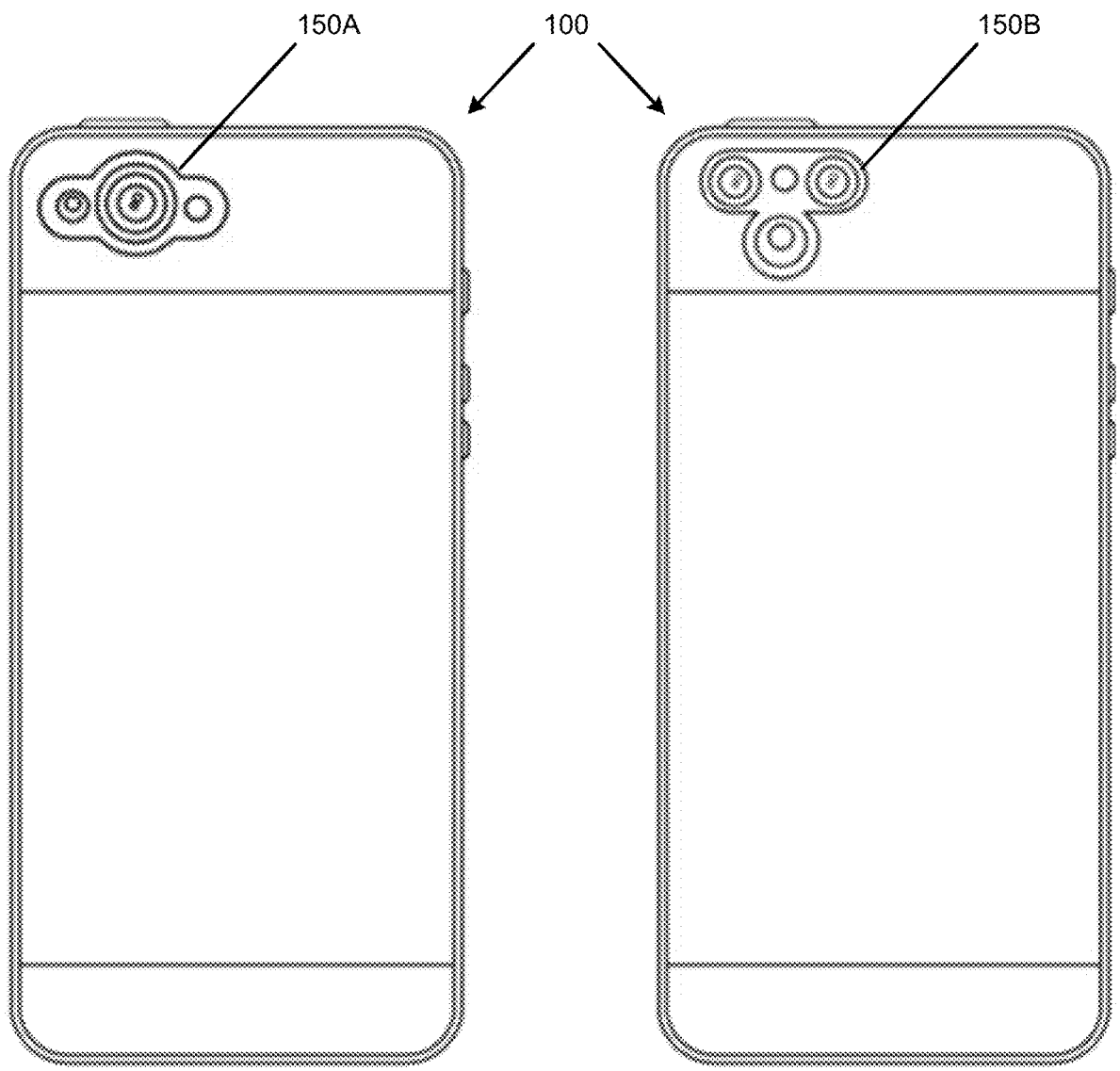
FIGS. 1A-1C illustrate an example mobile device with a detachable mini-camera, according to embodiments.

FIG. 1A illustrates an example mobile device with a detachable mini-camera of a first embodiment in an attached state (e.g., docked state), whereas FIG. 1B illustrates an example mobile device with a detachable mini-camera of a second embodiment in the attached state. Mobile device 100 is illustrated as a smartphone. However, mobile device 100 may comprise any type of mobile computing device, including a smartphone, tablet PC, laptop PC, and/or the like, which may comprise or benefit from an integrated camera. Typically, mobile device 100 will utilize wireless communications, such as cellular communications (e.g., via a Long Term Evolution (LTE) network) and/or Wi-Fi™ communications, to communicate with other devices over one or more wireless and/or wired, public and/or private networks, including, for instance, the Internet.

Mobile device 100 comprises a detachable mini-camera 150. While attached to mobile device, detachable mini-camera 150 may act in the same manner as any built-in camera. As illustrated, in the attached state, detachable mini-camera 150 is a rear-facing camera that is attached to the rear surface of mobile device 100. The rear surface is, for example, a surface that is on an opposite side of mobile device 100 as a display and/or inputs (e.g., a touch panel display) of mobile device 100. Alternatively or in addition to a detachable mini-camera 150 on the rear surface, mobile device 100 may comprise a detachable mini-camera 150 attached to the front surface of mobile device 100 (e.g., on the same surface as the display of mobile device 100). When attached to mobile device 100, detachable mini-camera 150 may be rear-facing (e.g., when attached to the rear surface of mobile device 100, or alternatively through the rear surface while attached via the front surface) or front-facing (e.g., when attached to the front surface of mobile device 100, or alternatively through the front surface while attached via the rear surface). As another alternative, detachable mini-camera 150 could comprise both rear and front surfaces of mobile device 100 (e.g., an entire detachable corner of mobile device 100, detachable top of mobile device 100, detachable side of mobile device 100, etc.).

Figure 1C:
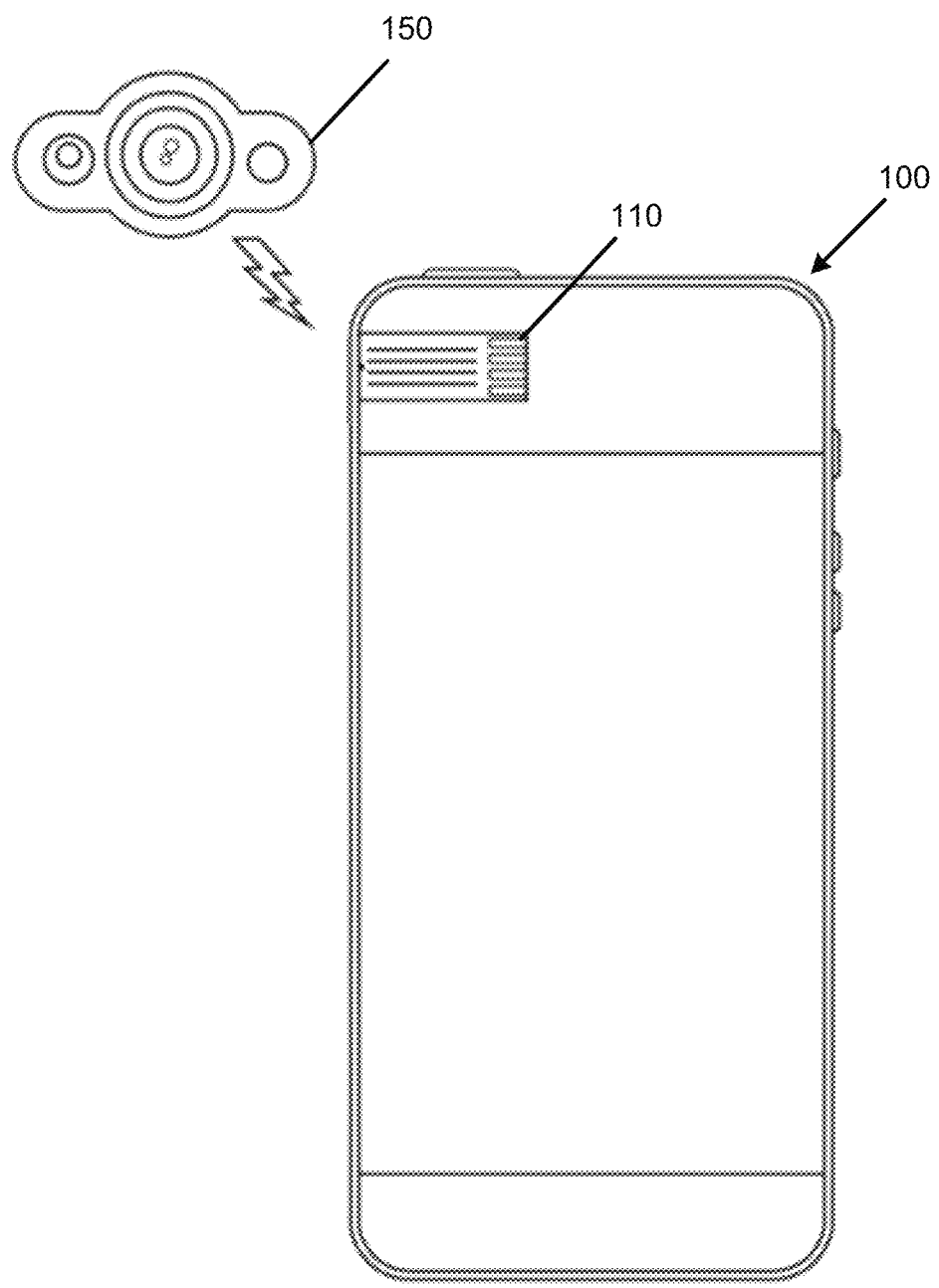

FIG. 1C illustrates an example mobile device with a detachable mini-camera in a detached state (e.g., undocked state), according to an embodiment. Specifically, detachable mini-camera 150 has been detached from mobile device 100, exposing a socket 110 within the surface of mobile device 100. Socket 110 may comprise grooves, rails, hooks, magnets, and/or other attachment components that detachably engage with corresponding attachment components on detachable mini-camera 150 (e.g., on the rear surface of detachable mini-camera 150), such that detachable mini-camera 150 can be easily and intuitively detached from socket 100 and attached to socket 100. In addition, socket 110 may comprise one or more electrical traces or other connectors that conductively couple with one or more corresponding electrical traces or other connectors on detachable mini-camera 150 (e.g., on the rear surface of detachable mini-camera 150) while the attachment components are engaged to attach detachable mini-camera 150 to mobile device 100. Again, while the rear surface of mobile device 100 is illustrated, alternatively or additionally, socket 110 may be formed in the front surface of mobile device 100 or another surface of mobile device 100. Furthermore, while detachable mini-camera 150A of the first embodiment is illustrated in FIG. 1C, the illustrated socket 110 can be used with or adapted for detachable mini-camera 150B of the second embodiment or any other embodiment of detachable mini-camera 150.

In the detached state, illustrated in FIG. 1C, detachable mini-camera 150 acts as a stand-alone camera that wirelessly communicates with mobile device 100. Specifically, detachable mini-camera 150 may comprise a transmitter that wirelessly transmits signals, encoding data, to a receiver in the main body of mobile device 100. For example, while detached from mobile device 100, detachable mini-camera 150 may wirelessly transmit captured image data (e.g., photographs, video recordings, live streams, etc.) to mobile device 100 (e.g., for storage, viewing, or other processing at mobile device 100), in real time as the image data is captured. As used herein, the noun "real time" and the adjective "real-time" refer to instances of both real time and near-real time (e.g., within milliseconds or a second from actual real time as determined by processing latency, network latency, and/or other communication latency). In addition, detachable mini-camera 150 may comprise a receiver that wirelessly receives signals from a transmitter of mobile device 100. In an embodiment, the detachable mini-camera 150 and/or mobile device 100 may comprise a transceiver that comprises both the transmitter and the receiver. Any wireless technology may be used for the wireless communication between detachable mini-camera 150 and mobile device 100, including, without limitation, Bluetooth™ Zigbee™, and/or the like.

In an embodiment, socket 110 comprises one or more electrical connectors that supply power to detachable mini-camera 150 in the attached state. Accordingly, detachable mini-camera 150 may comprise a rechargeable battery that, in the attached state in which detachable mini-camera 150 is attached to mobile device 100 via socket 110, is charged from a battery or other power supply of mobile device 100 via the electrical connectors in socket 110.

In an embodiment, socket 110 also comprises one or more electrical connectors that convey communication signals between detachable mini-camera 150 and mobile device 100. These electrical connector(s) may be the same as or different than the electrical connector(s) that supply power to detachable mini-camera 150. Thus, in the attached state, illustrated in FIGS. 1A and 1B, detachable mini-camera 150 may communicate with mobile device 100 via one or more direct electrical connections to socket 110. Alternatively, detachable mini-camera 150 could wirelessly communicate with mobile device 100 even in the attached state, in the same or similar manner as in the detached state. However, such an embodiment would likely result in higher battery consumption due to the operation of the wireless transceivers in both the detached and attached states.

Figure 2A:
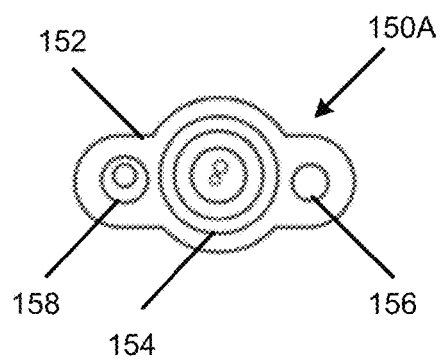
FIGS. 2A and 2B illustrate a detachable mini-camera, according to embodiments.
Figure 2B:
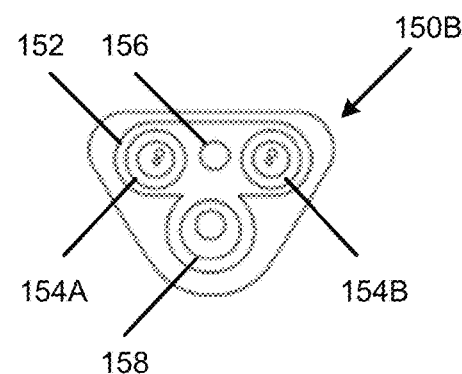
Figure 2B:
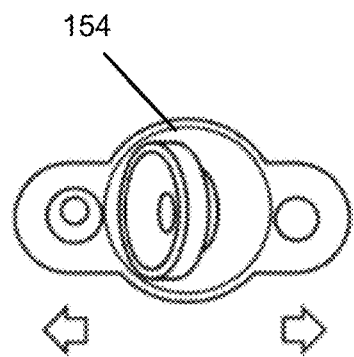
Figure 2B:
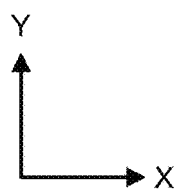
Figure 2B:
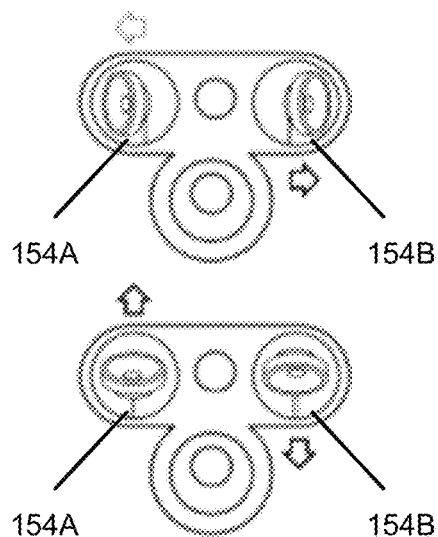
Figure 2B:
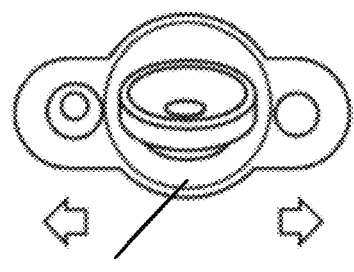

FIG. 2A illustrates the components of detachable mini-camera 150A of the first embodiment illustrated in FIG. 1A, whereas FIG. 2B illustrates the components of detachable mini-camera 150B of the second embodiment illustrated in FIG. 1B. Generally, detachable mini-camera 150 comprises a housing 152 configured to house one or more cameras 154, one or more sensors 156, and/or one or more flashes 158, as well as their associated or auxiliary electronic components. It should be understood that camera(s) 154, sensor 156, and flash 158 may be sealed (e.g., under a transparent layer, with waterproof seals or sealant, and/or the like) to prevent the intrusion of water, dust, or other substances into the housing of detachable mini-camera 150.

In the first embodiment, illustrated in FIG. 2A, detachable mini-camera 150A comprises one camera 154, one sensor 156, and one flash 158. This first embodiment corresponds more closely to traditional mobile cameras, with a single camera 154 positioned in the center of detachable mini-camera 150A, a single sensor 156 positioned on a first side of camera 154 (e.g., illustrated on the right side), and a single flash 158 positioned on a second side of camera 154 that is opposite to the first side (e.g., illustrated on the left side). Camera 154 may be capable of capturing both photographs and video recordings.

In the second embodiment, illustrated in FIG. 2B, detachable mini-camera 150B comprises two cameras 154A and 154B, one sensor 156, and one flash 158. In this second embodiment of detachable mini-camera 150B, cameras 154A and 154B may be identical or different in structure and/or function, and may operate independently from each other and/or in unison with each other. As one example, camera 154A may be a photographic camera dedicated to capturing photographs, whereas camera 154B is a video camera dedicated to capturing video (e.g., comprising a plurality of image frames). In the illustrated embodiment, sensor 156 is positioned equidistant between camera 154A and camera 154B, and flash 158 is positioned below sensor 156 and equidistant from camera 154A and camera 154B. However, other arrangements are possible.

In an embodiment, each camera 154 is capable of moving with respect to one or more axes. For example, as illustrated in FIGS. 2A and 2B, each camera 154 is capable of rotating around both an X-axis and a Y-axis. Alternatively, each camera may only be capable of rotating around one axis (e.g., the Y-axis) or may be fixed (i.e., not capable of rotation or other movement). In an embodiment in which camera 154 rotates, housing 152 may comprise, for each camera 154, an opening or recess which is configured to receive camera 154 while allowing camera 154 to rotate around the one or more axes without the camera's field of view being blocked by any portion of housing 152. Alternatively or additionally, the angle of rotation of camera 154 may be limited such that the camera's field of view will never be blocked by any portion of housing 152.

In an embodiment, sensor 156 is a separate component that is inset within an opening or recess of housing 152. Sensor 156 may comprise a sensor for detecting luminance, movement, proximity, and/or the like. Output from sensor 156 may be used to determine controls for camera(s) 154, flash 158, and/or other components of detachable mini-camera 150.

In an embodiment, flash 158 provides a flash or pulse of light for lighting the environment while an image or video is being captured by camera 154. Flash 158 may be controlled automatically by a mobile application executing on mobile device 100 and/or manually by a user of the mobile application. For example, a user may specify a specific flash mode within a graphical user interface of the mobile application, such as "automatic", "on", "off", "indoor", "outdoor", and/or the like. In the "automatic" mode, the mobile application may automatically utilize flash 158 when sensor 156 detects a low level of luminance (e.g., indicating a dark environment), while not utilizing flash 158 when sensor 156 detects a high level of luminance (e.g., indicating a bright environment). The mobile application could also automatically determine and utilize flash 158 at a plurality of different brightness levels depending on the level of luminance (e.g., higher brightness levels for lower levels of luminance, and lower brightness levels or no flash for higher levels of luminance). In the "on" mode, the mobile application may always utilize flash 158, regardless of any output from sensor 156 indicating a luminance of the environment. In the "off" mode, the mobile application may never utilize flash 158, regardless of any output from sensor 156 indicating a luminance of the environment. In the "indoor" mode, the mobile application may utilize flash 158, as in the "automatic" mode (i.e., depending on the luminance of the environment detected by sensor 156), but using a low-light flash level (i.e., less light than in the "outdoor" mode). In the "outdoor" mode, the mobile application may utilize flash 158, as in the "automatic" mode (i.e., depending on the luminance of the environment detected by sensor 156), but using a bright-light flash level (i.e., more light than in the "indoor" mode).

In an embodiment, housing 152 of detachable mini-camera 150 (e.g., 150A and/or 150B) may comprise one or more fastening mechanisms, configured to attach detachable mini-camera 150 to socket 110 of mobile device 100, as well as other objects (i.e., objects other than mobile device 100). For example, housing 152 may comprise a spring-loaded clip or clasp that is capable of being press-opened and biased by a spring to snap closed around an object. The object in this case may comprise clothing (e.g., the collar, pocket, or lapel of a shirt of jacket, the waist of pants, a belt, etc.), accessories (e.g., purse, glasses, etc.), and/or anything else that can fit within the grasp of the clip. Additionally or alternatively, housing 152 may comprise other fastening mechanisms (e.g., magnets, Velcro™, snaps, loops, etc.).

Figure 3A:
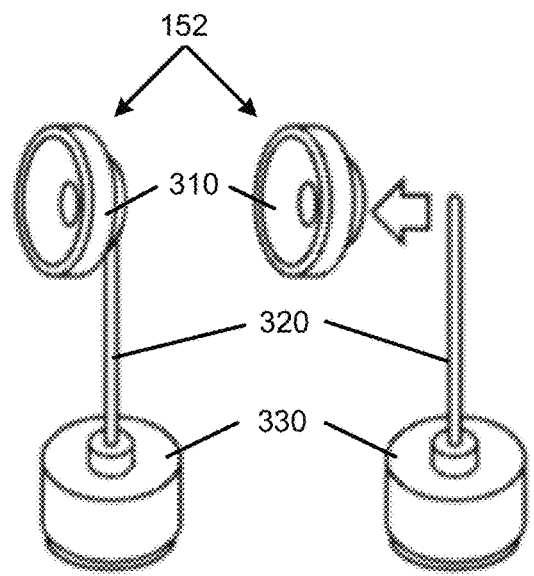
FIGS. 3A and 3B illustrate components of a detachable mini-camera, according to an embodiment.

FIG. 3A illustrates the components of camera 154, according to an embodiment. As illustrated, camera 154 comprises a mini-camera device 310 that is attached to a rod 320. Rod 320 is rotated by a ball-and-axis motor 330 that is powered, for example, by a rechargeable battery within housing 152 of detachable mini-camera 150.

In an embodiment, ball-and-axis motor 330 comprises an independent motor within a base (e.g., cylindrical or cubical base) that is fixed directly or indirectly to housing 152. The motor rotates or spins in either direction (e.g., clockwise and counterclockwise) around an axis that is coincident with the longitudinal axis of rod 320. The range of rotation of ball-and-axis motor 330 may be limited (e.g., to a fixed arc defined by an angle of rotation) to prevent full rotation.

In an embodiment, rod 320 is a long, thin, substantially cylindrical, but pin-shaped rod. Rod 320 may be positioned to extend along its longitudinal axis from a center of the base of ball-and-axis motor 330. Rod 320 may be fixed to ball-and-axis motor 330, such that it rotates with ball-and-axis motor 330, for example, within the same range of rotation as ball-and-axis motor 330.

In an embodiment, mini-camera device 310 is attached to rod 320 at or near an end of rod 320 that is opposite the end of rod 320 fixed to ball-and-axis motor 330. For example, mini-camera device 310 may be positioned on the tip of rod 320. In other words, one end of rod 320 is attached to ball-and-axis motor 330, and the other end of rod 320 is attached to mini-camera device 310. Thus, as ball-and-axis motor 330 rotates, rod 320 rotates due to its attachment to ball-and-axis motor 330, and this, in turn, causes mini-camera device 310 to rotate to the same degree as ball-and-axis motor 330 and rod 320. Consequently, if the range of rotation of ball-and-axis motor 330 and rod 320 are limited, the range of rotation of mini-camera device 310 is similarly limited.

In an embodiment, the range of rotation of the imaging face of mini-camera device 310 may comprise rotation in both a rotational direction around the longitudinal axis of rod 320 (e.g., axis Y in FIGS. 2A and 2B) as well as a rotational direction around an axis that is orthogonal to the longitudinal axis of rod 320 (e.g., axis X in FIGS. 2A and 2B). In other words, mini-camera device 310 may rotate left and right as well as up and down to reposition the camera face at any of a plurality of orientations within the range of rotation. For example, the backside of mini-camera device 310 may comprise a small motor, which, when activated, rotates the imaging face of mini-camera device 310 around the X axis that is orthogonal to the longitudinal Y axis of rod 320 (e.g., up and down with respect to the longitudinal Y axis of rod 320). In this manner, the range of rotation of imaging face of mini-camera device 310 may be nearly spherical or hemispherical (e.g., 180° around the longitudinal Y axis of rod 320 and 180° around the orthogonal X axis). An electrical connection (e.g., conductive trace, cable, etc.), for supplying power and/or control to the small motor, may be fed to the small motor through a hollow center of rod 320 and/or ball-and-axis motor 330, or alternatively may be external to rod 320 and/or ball-and-axis motor 330.

Figure 3B:
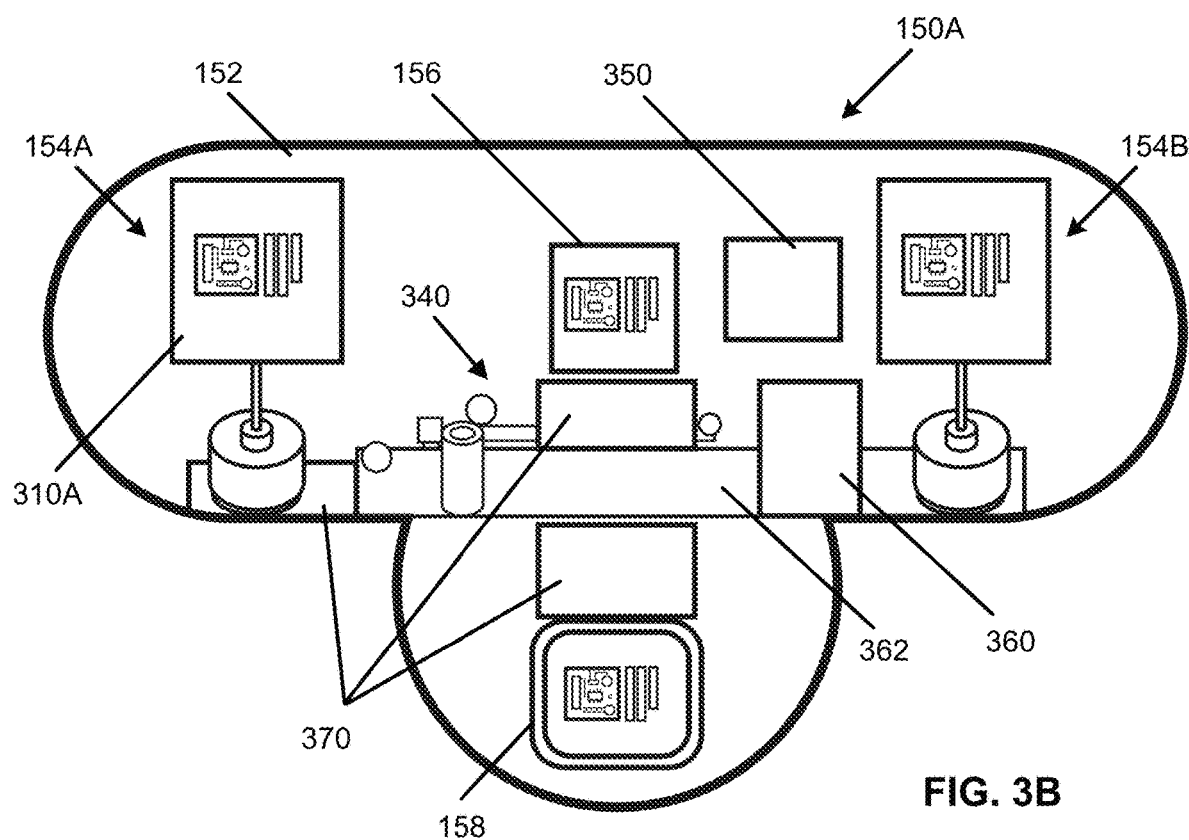

FIG. 3B illustrates the components of detachable mini-camera 150A, according to an embodiment. Detachable mini-camera 150B of the second embodiment may be implemented in a similar manner. Specifically, housing 152 comprises one or more internal and/or external recesses that are configured to receive one or more cameras 154, one or more sensors 156, one or more flashes 158, an electronics bed 340, one or more rechargeable batteries 350, one or more transceivers 360, and/or their associated or auxiliary components. During the manufacturing process, each component may be inserted into its corresponding recess, directly or indirectly fixed to housing 152, and conductively connected to other components via electrical connectors (e.g., 370) within housing 152 (e.g., within electronics bed 340). In addition, each of the camera(s) 154, sensor(s) 156, flash(es) 158, and/or transceiver(s) 360, may be conductively connected to rechargeable battery 350 (e.g., via electronics bed 340) so as to be powered by rechargeable battery 350, at least when detachable mini-camera 150 is in the detached state. Housing 152 may also be sealed with a transparent waterproof layer, waterproof seals or sealants, and/or the like to prevent the intrusion of water, dust, or other environmental elements into housing 152.

In an embodiment, electronics bed 340 comprises a thin substrate of strengthened material to which the electronic components of detachable mini-camera 150 are attached. The electronic components may also be electrically coupled via electronics bed 340 (e.g., via cables and/or electrical traces and/or other connectors within electronics bed 340). Electronics bed 340 is affixed to and/or otherwise seated within housing 152.

In an embodiment, rechargeable battery 350 comprises a lithium-ion battery (e.g., a micro 1A lithium-ion battery), which is seated in electronics bed 340 and charged by a charging module. The charging module may comprise one or more electrically conductive traces that, in the attached state, conductively contact a corresponding number of electrically conductive traces in socket 110 of mobile device 100, which are, in turn, conductively coupled to a battery of mobile device 100. Thus, when detachable mini-camera 150 is attached to mobile device 100 via socket 110, power is supplied from the battery of mobile device 100 to the electrically conductive traces of socket 110, and through the conductive contact, to the electrically conductive traces of the charging module, which relay the power to rechargeable battery 350, so as to charge rechargeable battery 350. Then, when detachable mini-camera 150 is detached from mobile device 100, rechargeable battery 350 is discharged to power the components of detachable mini-camera 150. Additionally or alternatively, the charging module may comprise a power socket (e.g., compliant with an industry standard, such as a Universal Serial Bus (USB) port) configured to receive power via an end of a power cable. In this case, rechargeable battery 350 may be charged from any power supply to which the other end of the power cable is attached (e.g., wall outlet, mobile backup battery, other electronic device, etc.).

In an embodiment, transceiver 360 is conductively coupled to electronics bed 340 and powered by rechargeable battery 340. Transceiver 360 may comprise a Bluetooth™ transceiver (e.g., a mini slave wireless Bluetooth™ 4.0 or 5.0 transceiver), which is capable of pairing with a Bluetooth™-capable transceiver of another device, such as mobile device 100. Bluetooth™ 5.0 supports a wireless communication range of 50-100 feet. However, wireless technologies, other than Bluetooth™ and/or with different wireless communication ranges can be used, and transceiver 360 may be capable of wireless communication using a plurality of different technologies (e.g., including Bluetooth™, Wi-Fi™, Zigbee™, and/or the like), using a plurality of frequency bands, and/or within a plurality of different wireless communication ranges.

In an embodiment, transceiver 360 is electrically coupled to a flex cable antenna 362, which is used to transmit wireless signals, representing data (e.g., image data captured by mini-camera device(s) 310), to a wireless receiver in mobile device 100, and/or receive wireless signals, representing data (e.g., control commands generated by mobile device 100), from a wireless transmitter in mobile device 100. Transceiver 360 may also be capable of receiving signals from Global Positioning System (GPS) satellites via flex cable antenna 362, for the purposes of determining a location of detachable mini-camera 150. For example, flex cable antenna 362 may comprise a Bluetooth™-GPS-Wi-Fi™ flex cable antenna that is capable of communicating via Bluetooth™ and Wi-Fi™ and receive GPS signals. Regardless of the specific wireless technology or technologies used, transceiver 360 may comprise an encoder configured to encode data (e.g., image data from camera 154) into a radio signal to be transmitted via flex cable antenna 362, and a decoder configured to decode data from a radio signal that has been received via flex cable antenna 362. The main body of mobile device 100 may comprise an identical, similar, or different transceiver having the same capabilities.

In an embodiment, once detachable mini-camera 150 is detached from socket 110 in mobile device 100, transceiver 360 automatically pairs (e.g., via Bluetooth™) with a transceiver in mobile device 100 to begin wireless communication with mobile device 100. Conversely, once detachable mini-camera 150 is attached to socket 110 in mobile device 100, transceiver 360 may automatically un-pair with the transceiver in mobile device 100 to end wireless communication with mobile device 100, and the components of detachable mini-camera 150 that are used for wireless communications (e.g., transceiver 360) may be powered down or turned off or operated in a power-saving mode (e.g., to reduce power consumption). Alternatively, detachable mini-camera 150 may always remain paired with the transceiver in mobile device 100 to perform wireless communication with mobile device 100, regardless of whether or not it is attached or detached from socket 110 (e.g., at the cost of increased power consumption). In either case, the wireless communication may comprise transceiver 360 transmitting data (e.g., image data, status data, etc.), collected by detachable mini-camera 150, to mobile device 100 (e.g., for processing by the mobile application described elsewhere herein), and receiving data (e.g., control commands, configuration data, etc.) from mobile device 100 (e.g., generated by the mobile application executing on mobile device 100).

In an embodiment, various components of detachable mini-camera 150 are electrically connected to each other within electronics bed 340 via one or more electrically conductive substrates or cables. For example, electronics bed 340 may comprise one or more flex cables 370 that couple to each camera 154, sensor 156, and/or flash 158. Each flex cable 370 may comprise a thin strip of fibrous and conductive material that supplies power (e.g., by relaying power from rechargeable battery 350) to camera, 154, sensor 156, and/or flash 158. In addition, flex cable(s) 370 may transmit control signals to camera 154, sensor 156, and/or flash 158 and/or receive signals from camera 154, sensor 156, and/or flash 158. For instance, in an embodiment, camera 154 may receive control signals, provide an output (e.g., image data), and receive power (e.g., to power ball-and-axis motor 330) via a first flex cable, sensor 156 may provide a sensor output and receive power via a second flex cable 370, and flash 158 may receive control signals (e.g., specifying when and/or how bright to flash) and receive power (e.g., to be converted into a pulse of light) via a third flex cable 370.

Figure 5:
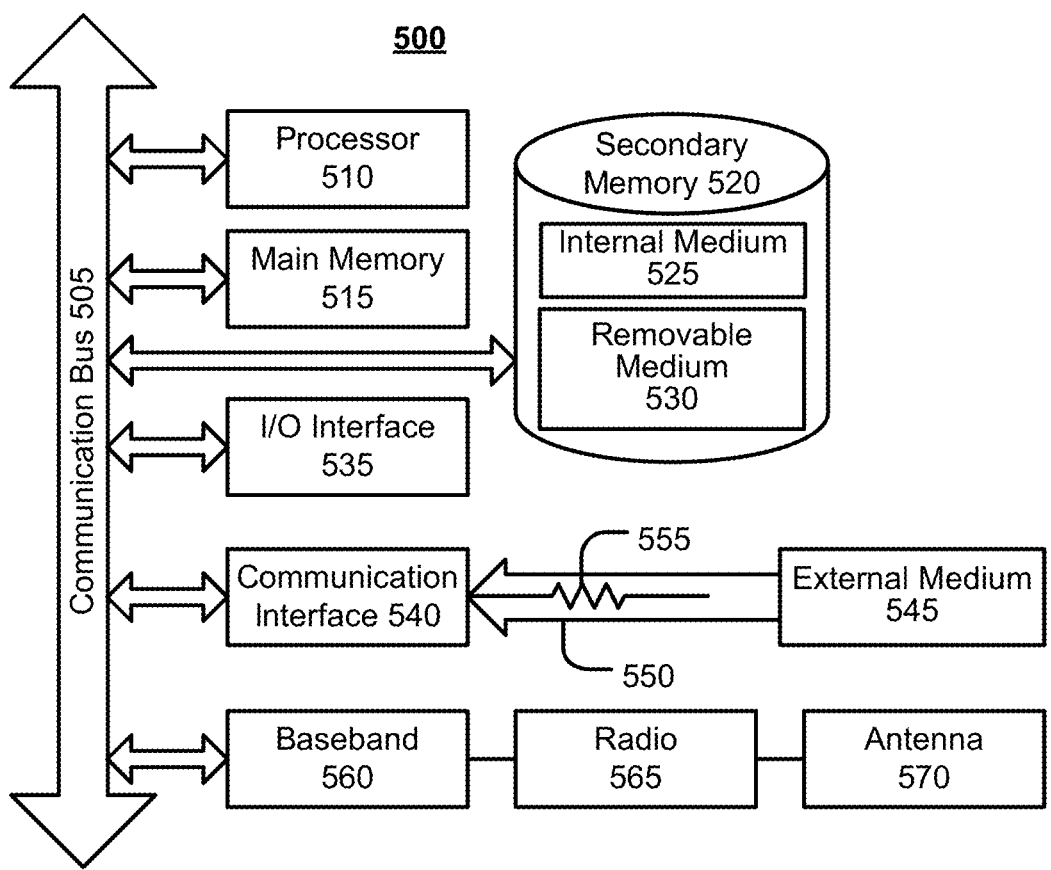
FIG. 5 illustrates an example processing system, by which one or more of the processes described herein (e.g., implemented by the mobile application), may be executed, according to an embodiment.

In an embodiment, detachable mini-camera 150 may also comprise one or more processors (not shown, but discussed in an embodiment with respect to FIG. 5). Each processor may comprise a central processing unit (CPU) that communicates with one or more of camera(s) 154, sensor(s) 156, flash(es) 158, and/or transceiver(s) 360 via one or more electrical connections (e.g., flex cables) on electronics bed 240. The processor may receive messages from the connected components, process the information in the messages, and/or control the connected components based on processed information. For example, the processor may receive control information (e.g., comprising control commands and/or configuration information), received and decoded by transceiver 360, and/or sensor output from sensor 156, and control one or more cameras 154 and/or flash 158 based on the control information. The control of a camera 154 may comprise moving the face of mini-camera device 310 by activating ball-and-axis motor 330, capturing a photograph and/or video, setting an exposure time during image capture (e.g., photograph and/or video capture), and/or controlling any other function or setting of camera 154. The control of flash 158 may comprise setting a light level, activating the flash to trigger a pulse of light (e.g., according to a set brightness level) during image capture, preventing activation of the flash in a low-light setting (e.g., as detected by sensor 156), and/or the like.

2. Mobile Application

In an embodiment, a mobile application is provided. The mobile application may be pre-installed on mobile device 100, for example, by the original equipment manufacturer (OEM). Additionally or alternatively, the mobile application may be a stand-alone application that is downloadable from an application store or other network site (e.g., website) for one or more operating systems (e.g., iOS™, Android™, Microsoft Windows™, etc.).

The mobile application may be stored and executed by a processor of mobile device 100 to control the functions and/or settings of detachable mini-camera 150. For example, the mobile application may generate a graphical user interface comprising one or more screens that each comprise one or more inputs that enable a user to control various functions or settings of detachable mini-camera 150. The screens of the graphical user interface may be navigable in any known manner, for example, using virtual buttons, touch gestures (e.g., taps, long presses, swipes, flicks, pinch-ins, pinch-outs, etc.).

FIGS. 4A-4H illustrate one or more screens of a graphical user interface 400, generated by a mobile application executing on mobile device 100 that is paired with a detachable mini-camera 150, according to an embodiment. Each screen may comprise one or more regions, implemented as frames and/or the like. Graphical user interface 400 may be displayed on a display of mobile device 100. In the illustrated embodiments, the display of mobile device 100 is integrated into a front surface of mobile device 100. It should be understood that, in these embodiments, socket 110, which receives detachable mini-camera 150, is on the opposite and rear surface of mobile device 100, and therefore, is not visible in FIGS. 4A-4H. Detachable mini-camera 150 may be attached to socket 110 or detached from socket 110 in each of the illustrated scenarios, as the function of the mobile application may be the same or similar regardless of whether or not detachable mini-camera 150 is attached.

2.1. Main Screen

Figures 4A, 4B:
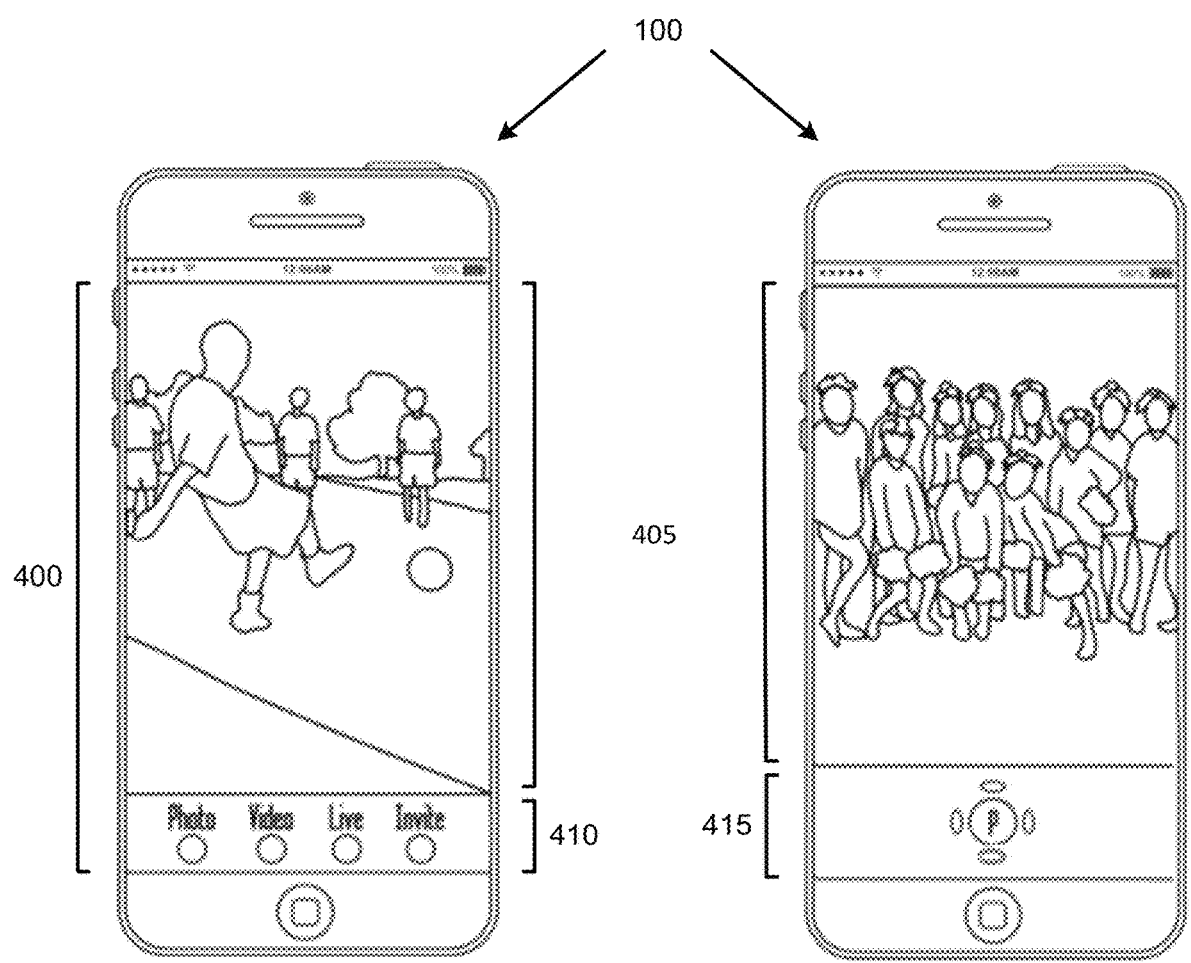

FIG. 4A illustrates a main screen (e.g., home or landing screen) of graphical user interface 400 of the mobile application, according to an embodiment. The main screen comprises a real-time-view region 405, which displays image data representing a real-time, optical field of view of camera 154 in detachable mini-camera 150. In the illustrated example, detachable mini-camera 150 may be detached from mobile device 100, in which case transceiver 360 is wirelessly transmitting the real-time optical field of view captured by camera 154 to mobile device 100, in real time. Alternatively, detachable mini-camera 150 may be attached to mobile device 100 via socket 110 on the rear surface of mobile device 100, in which case the real-time optical field of view captured by camera 154 may be non-wirelessly transferred from detachable mini-camera 150 to mobile device 100, in real time, via an electrical connection to socket 110. It should be understood that the entire graphical user interface 400 (e.g., illustrated in FIGS. 4A-4H) may be identical regardless of whether detachable mini-camera 150 is in the attached state or the detached state. In other words, graphical user interface 400 is no different when detachable mini-camera 150 is detached than when detachable mini-camera 150 is attached. However, an indication (e.g., icon and/or text) that detachable mini-camera 150 is detached may be displayed within graphical user interface 400 when detachable mini-camera 150 is detached and/or an indication (e.g., icon and/or text) that detachable mini-camera 150 is attached may be displayed within graphical user interface 400 when detachable mini-camera 150 is attached. Thus, advantageously, a user can easily determine whether the detachable mini-camera 150 is attached or detached without having to change the orientation of mobile device 100 or the user's perspective of mobile device 100 (e.g., in order to check the rear surface of mobile device 100). In addition, as discussed elsewhere herein, alerts and/or GPS tracking may be provided when detachable mini-camera 150 is attached, in order to reduce the likelihood that a detached mini-camera 150 is lost.

In an embodiment, the main screen also comprises an input region 410 (e.g., above or below real-time-view region 405). Input region 410 comprises one or more inputs for initiating a function of detachable mini-camera 150. For example, input region 410 may comprise inputs for initiating capture of a photograph, initiating a video recording, initiating a live stream (e.g., to a social media platform) of the image data being captured by detachable mini-camera 150, and/or inviting contact(s) to a group (e.g., for sharing a live stream).

2.2. Capturing Image Data

FIG. 4B illustrates a photograph screen of graphical user interface 400 of the mobile application, according to an embodiment. The photograph screen may be displayed when a user selects the input for initiating capture of a photograph in the main screen or other screen of graphical user interface 400. As illustrated, the photograph screen comprises real-time-view region 405. In addition, the photograph screen comprises an input region 415, which comprises one or more inputs for utilizing the photograph function of detachable mini-camera 150. For example, input region 415 may comprise inputs for zooming in (e.g., increasing a magnification of camera 154) and zooming out (e.g., decreasing a magnification of camera 154), inputs for rotating camera 154 in two or more directions (e.g., by activating a ball-and-axis motor 330 in camera 154), and/or an input for capturing a photograph. In the illustrated example, the input for capturing the photograph is a relatively large circular icon positioned in the center of input region 415 (e.g., with a "P" or other indication that detachable mini-camera 150 is in a mode for capturing photographs), with an input for zooming in above the circular icon, an input for zooming out below the circular icon, an input for rotating camera 154 to the left on the left side of the circular icon, and an input for rotating camera 154 to the right on the right side of the circular icon. Thus, a user can easily set the magnification and angle of camera 154 and capture a photograph at those settings. It should be understood that input region 415 could also comprise inputs for other settings, such as a flash setting, exposure setting, rotating or moving camera 154 in other directions (e.g., up and down), and/or the like.

FIG. 4C illustrates a video screen of graphical user interface 400 of the mobile application, according to an embodiment. The video screen may be displayed when a user selects the input for initiating a video recording in the main screen or other screen of graphical user interface 400. As illustrated, the video screen comprises real-time-view region 405. In addition, the video screen comprises an input region 420, which comprises one or more inputs for utilizing the video recording function of detachable mini-camera 150. For example, input region 420 may comprise an input for starting and stopping a video recording. In the illustrated example, the input for starting and stopping a video recording is a circular icon positioned in the center of input region 420 (e.g., with a "V" or other indication that detachable mini-camera 150 is in a mode for capturing video recordings). When no video is currently being recorded, a user may select the input to start a new video recording. Then, while a video is being recorded, a user may select the same input to stop the new video recording. When the video recording is stopped, the video recording may be automatically saved into a memory of mobile device 100. It should be understood that the input may change depending on whether or not a video is currently being recorded (e.g., the color of the icon may change between gray and red, the shape of the icon may change, etc.).

During recording of a video, image frames may be transmitted from detachable mini-camera 150 to the mobile device 100 in real time and stored in a memory of mobile device 100. Thus, when the video recording is stopped, the accumulated image frames may be stored in a video file on mobile device 100. Additionally, the image frames may be accumulated in a memory of detachable mini-camera 150. In this case, in an alternative embodiment, when the video recording is stopped, a processor of detachable mini-camera 150 may store the image frames in a video file and transmit the video file to mobile device 100 for storage.

FIG. 4D illustrates a live-stream screen of graphical user interface 400 of the mobile application, according to an embodiment. The live-stream screen may be displayed when a user selects the input for initiating a live stream in the main screen or other screen of graphical user interface 400. As illustrated, the live-stream screen comprises real-time-view region 405. In addition, the live-stream screen comprises an input region 425, which comprises one or more inputs for utilizing the live-stream function of detachable mini-camera 150. For example, input region 425 may comprise an input for starting and stopping a live stream. In the illustrated example, the input for starting and stopping a live stream is a circular icon positioned in the center of input region 425 (e.g., with an "L" or other indication that detachable mini-camera 150 is in a mode for capturing a live stream). When no live stream is currently being captured, a user may select the input to start a new live stream. Then, while a live stream is being captured, a user may select the same input to stop the live stream. It should be understood that the input may change depending on whether or not a live stream is currently being captured (e.g., the color of the icon may change between gray and red, the shape of the icon may change, etc.). Additionally or alternatively, another indication (e.g., a green circle) may be displayed (e.g., in the far left of input region 425) while a live stream is being captured.

During a live stream, image frames may be transmitted from detachable mini-camera 150 to mobile device 100 in real time. In addition to continuously and sequentially displaying the image frames in real-time-view region 405, mobile device 100 may also relay the image frames, over one or more wireless networks (e.g., a cellular network providing access to the Internet), to another device (e.g., another mobile device) or to a social networking platform to be shared with other devices and/or saved through the social networking platform. In this manner, the image frames captured by detachable mini-camera 150 are relayed through mobile device 100 to another device or to a sharing platform.

While illustrated with respect to the live-stream screen in FIG. 4D, but not with respect to the video screen in FIG. 4C, both of these screens may comprise an input for zooming in (e.g., above the respective input for starting and stopping a video recording or live stream), an input for zooming out (e.g., below the respective input for starting and stopping a video recording or live stream), an input for rotating camera 154 to the left (e.g., on the left side of the respective input for starting and stopping a video recording or live stream), and an input for rotating camera 154 to the right (e.g., on the right side of the respective input for starting and stopping a video recording or live stream). Thus, a user can easily set the magnification and angle of camera 154 before and/or during a video recording and/or live stream. It should be understood that input regions 420 and/or 425 could also comprise inputs for other settings, such as a flash setting, exposure setting, rotating or moving camera 154 in other directions (e.g., up and down), and/or the like.

2.3. Sharing Groups

Figure 4E:
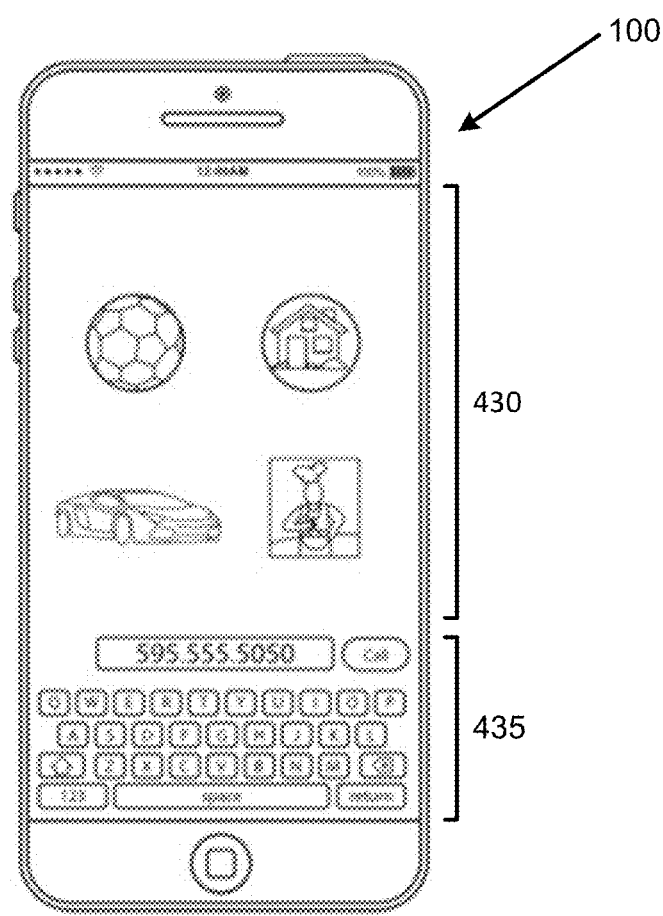

FIG. 4E illustrates a grouping screen of graphical user interface 400 of the mobile application, according to an embodiment. The grouping screen may be displayed when a user selects the input for inviting contact(s) to join a group in the main screen or other screen of graphical user interface 400. As illustrated, the grouping screen may comprise one or more inputs for creating groups of contacts for the purposes of sharing image data captured by detachable mini-camera 150 using the mobile application. A user may utilize the input(s) to create a group, name the group, and add or invite contacts to the group.

In the illustrated embodiment, the grouping screen comprises an icon-selection region 430 and an input region 435. Icon-selection region 430 comprises a plurality of selectable icons. The user can select one of the plurality of selectable icons (e.g., by tapping the icon in an embodiment which utilizes a touch panel display), and the selected icon will be assigned to the new group as a pictorial representation of the group. Input region 435 comprises a textbox, virtual keyboard, and/or other inputs for specifying a name of the group and identifying one or more contacts to be added or invited to the group. The contact(s) may be selected from a virtual address book stored in a memory of mobile device 100 or entered directly by the user. In an embodiment, mobile application sends an invitation for joining the group to each selected contact. For example, the invitation may be a Short Message Service (SMS) or Multimedia Messaging Service (MMS) message that is sent by a transmitter of mobile device 100, via one or more data networks, to a cellular number of a mobile device of each contact. The invitation may comprise a link or other element that, when selected by the invited contact, initiates a process of joining the group. Alternatively or additionally, the invitation may prompt the invited contact to reply to the message in order to accept and/or decline the invitation (e.g., using a specific keyword to accept the invitation and/or a specific keyword to decline the invitation). As examples, the user may utilize the grouping screen to create a "soccer" group for sharing a live stream of a child's soccer game, a "real estate" group for sharing a live stream of an open house that the user is attending, a "car" group for sharing a live stream of the user's car ride, a "cooking" group for sharing a live stream of the user cooking a food dish, and/or the like.

2.4. Object Tracking

Figure 4F:
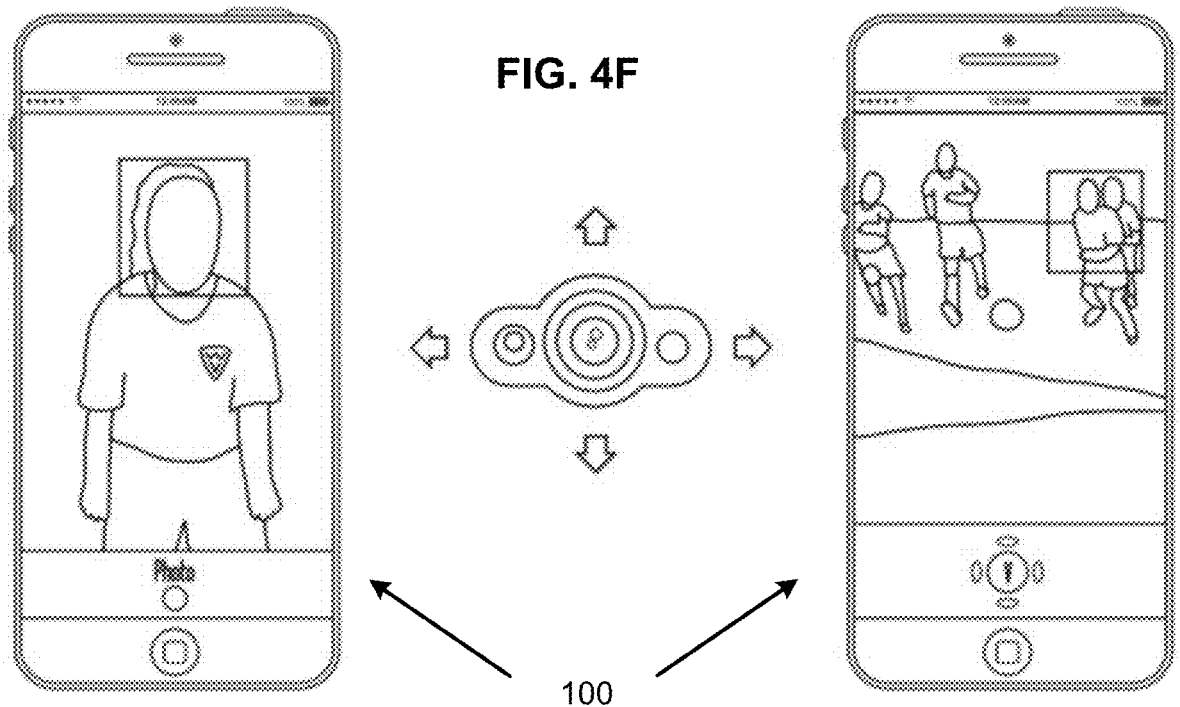

FIG. 4F illustrates a tracking function of the mobile application, according to an embodiment. First, the user may capture a photograph of an object using, for example, the photograph screen or a similar screen.

Second, an object to be tracked may be identified in the captured photograph. This identification may comprise the user moving or drawing a polygon (e.g., square) around the object of interest. Alternatively, the mobile application may automatically identify the object of interest, for example, using object detection (e.g., facial detection). In the illustrated example, the identified object of interest is the face of the user's daughter who is about to participate in a soccer game. Once the object of interest is identified, the mobile application may generate a representation of the object of interest that can be used for subsequent object detection. For instance, the representation of the object of interest may comprise a feature vector, which comprises a plurality of values that define a set of references features for the object of interest.

Third, once the object of interest has been identified and converted into a reference representation (e.g., a feature vector describing the object of interest), the mobile application may automatically control detachable mini-camera 150 to track the object of interest during a subsequent video recording and/or live stream, using real-time object detection and tracking within the image frames of the video recording or live stream. Specifically, detachable mini-camera 150 may capture a plurality of image frames and transmit the captured image frames to the mobile application on mobile device 100 in real time. The mobile application receives the captured image frames and performs object detection (e.g., facial recognition in the illustrated example) on each image frame, using the reference representation, as each image frame is received. The object of interest is detected whenever an object in the image frame matches the reference representation. When the object of interest is detected within an image frame, its position within the field of view of camera 154 may be determined and a degree of rotation and/or other distance of movement, required to center the object of interest within the field of view of camera 154, may be calculated. Then, the mobile application may transmit a control command to transceiver 360 in detachable mini-camera 150 that instructs the camera 154 to rotate according to the calculated degree of rotation and/or move according to the calculated distance of movement. Upon receiving the control command, a processor or other component in detachable mini-camera 150 may control ball-and-axis motor 330 to rotate or otherwise move mini-camera device 310 according to the calculated degree of rotation and/or distance of movement. In this manner, the mobile application controls camera 154 to continually center the object of interest within the field of view of camera 154.

Advantageously, this automated object tracking facilitates hands-free video recording or live streaming by detachable mini-camera 150. For instance, it is contemplated that a user could detach detachable mini-camera 150 from mobile device, and clip or otherwise fasten detachable mini-camera 150 to another object. As long as detached mini-camera 150 remains within a wireless communication range of mobile device 100, the mobile application may continue to control detached mini-camera 150 and record and/or stream image data captured by detached mini-camera 150. For example, the user could fasten detached mini-camera 150 to a relatively stationary object and continue to use his or her mobile device 100 (e.g., to make or receive telephone calls, send or receive text messages, browse the Internet, and/or perform any other conventional function of a mobile device), without having to worry about properly orienting or steadying mobile device 100 to capture the image data, or store his or her mobile device 100 (e.g., in a pocket or purse) without having to worry about obscuring the camera. In the illustrated example, the user is free to relax and watch his or her daughter's soccer game without having to hold and move mobile device 100, while detached mini-camera 150 properly records or live streams the soccer game and camera(s) 154 track the daughter. In addition, in the case of a live stream, contacts who have joined the sharing group for the live stream may also watch the soccer game on their own devices, without the user having to worry about the contacts having a negative viewing experience.

It should be understood that detachable mini-camera 150 may operate in the same manner, even when attached to mobile device 100 via socket 110. In this case, the mobile application will still control camera(s) 154 to rotate and/or otherwise move to track the object of interest, in the same manner as in the detached state, except, in an embodiment, using non-wireless communications. However, because the orientation of attached mini-camera 150 will depend on the orientation of mobile device 100, the user will need to maintain mobile device 100 in a proper orientation to ensure proper video recording or live streaming and object tracking.

2.5. Editing

Figures 4G, 4H:
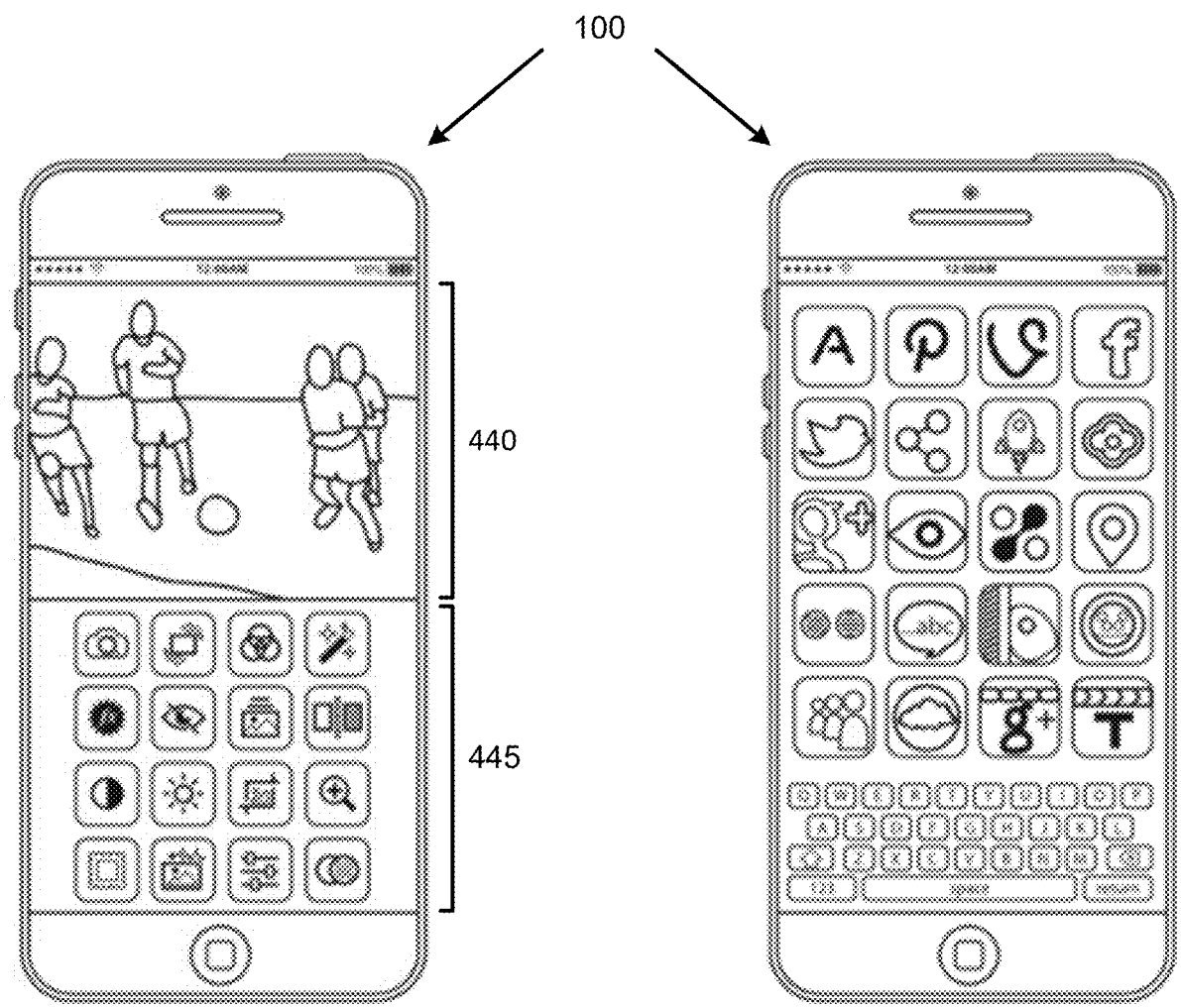

FIG. 4G illustrates an editing screen of graphical user interface 400 of the mobile application, according to an embodiment. The editing screen may be displayed when a user selects an input for performing editing in the main screen or other screen of graphical user interface 400. As illustrated, the editing screen comprises a viewing region 440 for viewing a real-time field of view of detachable mini-camera 150 and/or a stored photograph or video recording. In addition, the editing screen comprises an input region 445 for selecting one or more of a plurality of selectable editing options. The plurality of selectable editing options may comprise standard image-processing functions to be performed on the image data in viewing region 440, such as flipping or rotating the image data, removing red eye in the image data, modifying a contrast in the image data, modifying a brightness of the image data, cropping the image data, converting the image data between color and black-and-white, applying one or more filters to the image data, and/or the like. The user may be provided with editing options that are available via one or both of the mobile application and the manufacturer of mobile device 100.

2.6. Sharing

FIG. 4H illustrates a sharing screen of graphical user interface 400 of the mobile application, according to an embodiment. The sharing screen may be displayed when a user selects an input for specifying settings in the main screen or other screen of graphical user interface 400. As illustrated, the sharing screen comprises a plurality of selectable representations of sharing platforms (e.g., social media platforms, such as Facebook™ Twitter™, Instagram™, etc.). The user may select one or more of the sharing platforms to be used, for example, when live streaming the image data from detachable mini-camera 150. Thus, the user can pre-select the platform to be used during subsequent live streaming or when otherwise sharing image data.

2.7. Detachment Alert

In an embodiment, the mobile application detects and alerts the user when detachable mini-camera 150 is detached from mobile device 100. For example, socket 110 may comprise a mechanical, magnetic, or electrical detection sensor to detect whether or not detachable mini-camera 150 is currently inserted in socket 110. The mobile application or other software or hardware in mobile device 100 may set a flag whenever the detection sensor indicates that detachable mini-camera 150 is detached, and the mobile application may provide an alert whenever the flag indicates that detachable mini-camera 150 is detached. The alert may comprise a visual indication (e.g., a graphical element on a display of mobile device 100, a flashing or lit light-emitting diode (LED) of mobile device 100, etc.), an audio alert (e.g., by a speaker of mobile device 100), a vibration of mobile device 100 (e.g., by a piezoelectric element within the main body of mobile device 100), and/or the like.

For example, whenever and for as long as detachable mini-camera 150 is detached from mobile device 100, the top, bottom, or corner of graphical user interface 400 may comprise a graphical element which indicates that detachable mini-camera 150 is detached. Alternatively or additionally, whenever and for as long as detachable mini-camera 150 is detached from mobile device 100, a LED in mobile device 100 may stay lit or flash at predetermined intervals (e.g., every few seconds).

Additionally or alternatively, whenever and for as long as detachable mini-camera 150 is detached from mobile device 100, the mobile application may determine or estimate a distance between detached mini-camera 150 and mobile device 100. For example, the mobile application could estimate the distance based on a signal strength (e.g., received signal strength indication (RSSI)) of the wireless signal received from detached mini-camera 15, with stronger signal strengths indicative of a closer distance and weaker signal strengths indicative of a farther distance. Alternatively, detached mini-camera 150 may comprise a GPS receiver (e.g., comprising flex cable antenna 362) and may wirelessly transmit its GPS location, obtained via the GPS receiver, to the mobile application at predetermined intervals. In this case, the mobile application may acquire the GPS location of mobile device 100 (e.g., via a GPS receiver in mobile device 100) and calculate the distance between the GPS location of detached mini-camera 150 and the GPS location of mobile device 100. Regardless of how the distance between detached mini-camera 150 and mobile device 100 is determined or estimated, the mobile application may activate an alert whenever the distance exceeds a predetermined threshold, indicating that the distance is approaching the maximum limit of the wireless communication range (e.g., 50 feet) supported by the wireless technology being used by transceiver 360. While the distance is below the predetermined threshold, the mobile application does not activate the alert. In an embodiment, the alert may be visual, auditory, and/or vibratory and designed to be very likely to attract the user's attention. For example, the alert may comprise flashing a bright light using an LED and/or other light source of mobile device 100, outputting a shrill sound from a speaker of mobile device 100, strongly vibrating the housing of mobile device 100, and/or the like. The alert may also comprise displaying a prominent prompt, on the display of mobile device 100 (e.g., within graphical user interface 400), that requests the user to reattach detached mini-camera 150 to mobile device 100.

In an embodiment, multiple levels of alerts may be used. For example, when detachable mini-camera 150 is in the detached state, the mobile application may display a non-obtrusive visual indication within graphical user interface 400. If the distance between detached mini-camera 150 and mobile device 100 reaches a first predetermined threshold, the mobile application may provide a less obtrusive visual indication and/or a weak auditory and/or vibratory alert. Then, if the distance between detached mini-camera 150 and mobile device 100 reaches a second predetermined threshold, that is greater than the first predetermined threshold, the mobile application may prominently warn the user (e.g., by prompting the user to reattach detached mini-camera 150) within graphical user interface 400 (e.g., by using the entire graphical user interface 400 for the prompt) and/or provide a strong auditory and/or vibratory alert. Advantageously, this minimizes the likelihood that a user will forget about and lose detached mini-camera 150, while also minimizing the annoyance to the user.

2.8. GPS Locator

In an embodiment, the mobile application comprises a GPS tracking function for locating a detached mini-camera 150 (e.g., if it is lost). For example, detached mini-camera 150 may comprise a GPS receiver (e.g., comprising flex cable antenna 362) and may wirelessly transmit its GPS location, obtained via the GPS receiver, to the mobile application at predetermined intervals. The mobile application may store the most recent GPS location or a rolling window of a predetermined number (e.g., ten) of the most recent GPS locations reported by detached mini-camera 150. Thus, even if detached mini-camera 150 is outside the range of wireless communication, the mobile application can utilize the most recent known location of detached mini-camera 150 to guide the user to detached mini-camera 150. Advantageously, this minimizes the likelihood that detached mini-camera 150 will be permanently lost.

Specifically, if the user has lost detached mini-camera 150, the user may navigate to a GPS-tracking screen within graphical user interface 400 of the mobile application. The GPS-tracking screen may comprise a virtual map of a vicinity of mobile device 100. The mobile application may acquire the current GPS location of mobile device 100 (e.g., via a GPS receiver in mobile device 100) and mark the current GPS location of mobile device 100 on the virtual map. In addition, the mobile application may retrieve the most recent known GPS location of detached mini-camera 150 from memory and mark the most recent known GPS location of detached mini-camera 150 on the virtual map. The GPS-tracking screen may also comprise directions to guide the user from the current location of mobile device 100 to the most recent known location of detached mini-camera 150.

If detached mini-camera 150 is stationary, it should still be at its most recent known location. However, if detached mini-camera 150 is not stationary, it may no longer be at the most recent known location. However, the most recent known location at least provides a starting point for locating detached mini-camera 150. For example, it may be that detached mini-camera 150 is still nearby the most recent known location. In this case, when the user brings mobile device 100 to the most recent known location, if detached mini-camera 150 is close enough to be within wireless communication range with mobile device 100 and assuming that transceiver 360 is still being powered (e.g., by rechargeable battery 350), the mobile application should receive an updated GPS location from transceiver 360. The mobile application may then update the most recent known GPS location of detached mini-camera 150 on the virtual map in the GPS-tracking screen and/or update the directions, to guide the user to the updated GPS location.

3. Example Usage

One example usage of detachable mini-camera 150 and the associated mobile application will now be described. The described example is simply one illustration of how a typical user might utilize the disclosed embodiments for a specific purpose, and should not be considered limiting in any manner.

The user may start by detaching detachable mini-camera 150 from mobile device 100, for example, by sliding detachable mini-camera 150 out of socket 110. The user may fasten detached mini-camera 150 to the user's person, for example, by clipping it to the user's shirt, hat, or sunglasses. In an embodiment, when detached from mobile device 100, detachable mini-camera 150 may seamlessly (i.e., without interruption) transition from being powered by the battery of mobile device 100 to being powered by rechargeable battery 350. Furthermore, in response to being detached from mobile device 100, detached mini-camera 150 may automatically activate and power up transceiver 360 to begin wirelessly communicating with mobile device 100.

The user may also activate the mobile application. For example, the user may select an icon associated with the mobile application within a graphical user interface of mobile device 100 to execute the mobile application in the foreground of mobile device 100. When first activated, the mobile application may display a main screen (e.g., the main screen illustrated in FIG. 4A). Once activated, the user can navigate through one or more screens of the mobile application to control detached mini-camera 150 and/or specify settings for detached mini-camera 150. As discussed elsewhere herein, the mobile application may perform the alert function to prevent detached mini-camera 150 from being lost.

If the user wishes to take a photograph, the user may navigate to a photograph screen (e.g., the photograph screen illustrated in FIG. 4B) to transition the mobile application to a photography mode. The user may utilize inputs within the photograph screen to zoom in, zoom out, rotate a photographic camera 154 in detached mini-camera 150 (e.g., left, right, up, and/or down), and/or specify other settings. In response to these inputs, the mobile application wirelessly transmits one or more control commands to detached mini-camera 150, and, in response to receiving the control command(s), detached mini-camera 150 adjusts the components of detached mini-camera 150 (e.g., camera 154, flash 158, etc.) according to the control command(s). Once the user has specified all the desired settings, the user may select an input for capturing a photograph. In response to this input, the mobile application wirelessly transmits a control command for capturing a photograph to detached mini-camera 150, and, in response to receiving the control command, detached mini-camera 150 captures the photograph, and wirelessly transmits the photograph to the mobile application. Upon receiving the photograph from detached mini-camera 150, the mobile application may display the photograph on a display of mobile device 100 and/or save the photograph to a memory of mobile device 100 (e.g., in association with a gallery or camera roll).

As another example, if the user wishes to record a video, the user may navigate to a video screen (e.g., the video screen illustrated in FIG. 4C) to transition the mobile application to a video mode. The user may select an input within the video screen for starting a video recording. In response to this input, the mobile application wirelessly transmits a control command for starting the video recording to detached mini-camera 150, and, in response to receiving the control command, detached mini-camera 150 begins capturing image frames and wirelessly transmitting those image frames to mobile application, which accumulates each received image frame in a memory of mobile device 100. Once the user has decided to end the video recording, the user may select an input for ending the video recording (e.g., the same input that was used to start the video recording). In response to this input, the mobile application wirelessly transmits a control command for ending the video recording to detached mini-camera 150, and, in response to receiving the control command, detached mini-camera 150 stops capturing image frames while wirelessly transmitting any previously untransmitted image frames to mobile application. Once all image frames have been received or as the image frames are received, the mobile application saves the accumulated image frames as a video file in the memory of mobile device 100 (e.g., in association with a gallery or camera roll). Before or during the video recording, the user may utilize inputs within the video screen to zoom in, zoom out, rotate a video camera 154 in detached mini-camera 150 (e.g., left, right, up, and/or down), and/or specify other settings. In response to these inputs, the mobile application wirelessly transmits one or more control commands to detached mini-camera 150, and, in response to receiving the control command(s), detached mini-camera 150 adjusts the components of detached mini-camera 150 (e.g., camera 154) according to the control command(s).

As yet another example, if the user wishes to live stream, the user may navigate to a live-stream screen (e.g., the live-stream screen illustrated in FIG. 4D) to transition the mobile application to a live-stream mode. The user may select an input within the live-stream screen for starting a live stream. In response to this input, the mobile application wirelessly transmits a control command for starting the live stream to detached mini-camera 150, and, in response to receiving the control command, detached mini-camera 150 begins capturing image frames and wirelessly transmitting those image frames to mobile application, which relays the image frames (e.g., with or without intermediate processing) to another device or sharing platform (e.g., social media platform). Once the user has decided to end the live stream, the user may select an input for ending the live stream (e.g., the same input that was used to start the live stream). In response to this input, the mobile application wirelessly transmits a control command for ending the live stream to detached mini-camera 150, and, in response to receiving the control command, detached mini-camera 150 stops capturing image frames. Before or during the live stream, the user may utilize inputs within the live-stream screen to zoom in, zoom out, rotate a video camera 154 in detached mini-camera 150 (e.g., left, right, up, and/or down), and/or specify other settings. In response to these inputs, the mobile application wirelessly transmits one or more control commands to detached mini-camera 150, and, in response to receiving the control command(s), detached mini-camera 150 adjusts the components of detached mini-camera 150 (e.g., camera 154) according to the control command(s).

Prior to or during the live stream, the user may also create a new group of contacts (e.g., via the grouping screen illustrated in FIG. 4E) or specify an existing group of contacts (e.g., via the grouping screen illustrated in FIG. 4E or via an input in the live-stream screen) to be invited to view the live stream. If a group is selected, the mobile application may send an invitation (e.g., SMS or MMS message) to each contact in the group with a link (e.g., hyperlink) to the resource, associated with the live stream, on a sharing platform (e.g., a social media platform) or other information for joining the live stream. Contacts who select the link or otherwise accept the invitation may view the live stream via the sharing platform (e.g., using their credentials to log in to their respective user accounts on the sharing platform if the live stream is private, or without authentication if the live stream is public).

If the user wishes to use the object tracking function of the mobile application (e.g., to track a person of interest in a video recording or live stream), the user may navigate to an object-identification screen (e.g., the object-identification screen illustrated on the left side in FIG. 4F). The user may select an input within the capture screen to select or capture a photograph of the object of interest, and identify the object of interest within the photograph. In response to the identification of the object of interest, the mobile application will generate a reference feature vector to be used for tracking the object of interest. The user may then (contemporaneously or at some much later time) navigate to the video screen (e.g., the video screen illustrated in FIG. 4C) or the live-stream screen (e.g., the live-stream screen illustrated in FIG. 4D) and begin a video recording or live stream, as discussed above. During the video recording or live stream, the mobile application will compare features in the captured image frames to the reference feature vector to recognize the object of interest within the captured image frames, and control detached mini-camera 150 to rotate and/or otherwise move camera 154 (e.g., left or right, up or down, etc.) to maintain the object of interest within a vicinity of the center of subsequent image frames. In this manner, the user can simply detach mini-camera 150 from mobile device 100 and fasten the detached mini-camera 150 to another object or set the detached mini-camera 150 on another object, such that the user can watch the action live without having to hold and position mobile device 100.

As a concrete example, a user may wish to live-stream his daughter's soccer game to the daughter's grandparents who reside in a different state and the daughter's mother who is out of town for a business meeting, and therefore, are unable to attend the soccer game in person. However, the user also wishes to relax and enjoy his daughter's soccer game. Using a mobile device 100 with the detachable mini-camera 150 and the mobile application of disclosed embodiments, the user is able to achieve both objectives. Specifically, the user may use the mobile application to create or select a group of contacts (e.g., using the grouping screen illustrated in FIG. 4E) that consists of the daughter's mother and grandparents (e.g., identified by their respective telephone numbers). The mobile application will send invitations to the daughter's mother and grandparents which provide each of them with a hyperlink to a social networking platform, selected by the user (e.g., using the sharing screen illustrated in FIG. 4H), and a resource through which the soccer game will be live streamed. The user may also use the mobile application to capture a photograph of his daughter prior to the game and identify his daughter's face in the photograph to the mobile application for object tracking (e.g., using the object-identification screen illustrated on the left side in FIG. 4F). The user may detach detachable mini-camera 150 from his mobile device 100, fasten detached mini-camera 150 to his shirt or hat, and use the mobile application to begin a live stream (e.g., using the live-stream screen illustrated in FIG. 4D). Afterwards, the user may store mobile device 100 in his pocket and watch the game live without having to worry about mobile device 100, detached mini-camera 150, and the mobile application. The mobile application will wirelessly communicate with detached mini-camera to control camera 154 in detached mini-camera 150, while detached mini-camera 150 is clipped to the user's shirt or hat, to track the daughter on the soccer field, and relay the image data, captured by camera 154 and representing the live stream, to the social networking platform selected by the user, in real time. The social networking platform will, in turn, provide the live stream to the daughter's grandparents and mother.

If the user wishes to edit a photograph, video recording, or live stream, before, during, or after capture, the user may navigate to an editing screen (e.g., the editing screen illustrated in FIG. 4G). The user may select one or more inputs associated with editing options, such as filters, effects, settings (e.g., brightness, exposure, etc.), and/or the like, to easily apply image processing to the photograph or to the image frames of the video recording or live stream.

4. Example Processing Device

FIG. 5 is a block diagram illustrating an example wired or wireless system 500 that may be used in connection with various embodiments described herein. For example, system 500 may be used as or in conjunction with one or more of the functions, processes, or methods (e.g., to store and/or execute the mobile application or one or more software modules of the mobile application) described herein, and may represent components of mobile device 100, detachable mini-camera 150, device 700, device 800, and/or other processing devices described herein. System 500 can be a smartphone, a controller for detachable mini-camera 150, or any other processor-enabled device that is capable of wired or wireless data communication. Other computing systems and/or architectures may be also used, as will be clear to those skilled in the art.

System 500 preferably includes one or more processors, such as processor 510. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 510. Examples of processors which may be used with system 500 include, without limitation, the Pentium® processor, Core i7® processor, and Xeon® processor, all of which are available from Intel Corporation of Santa Clara, Calif.

Processor 510 is preferably connected to a communication bus 505. Communication bus 505 may include a data channel for facilitating information transfer between storage and other peripheral components of system 500. Furthermore, communication bus 505 may provide a set of signals used for communication with processor 510, including a data bus, address bus, and/or control bus (not shown). Communication bus 505 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 500 preferably includes a main memory 515 and may also include a secondary memory 520. Main memory 515 provides storage of instructions and data for programs executing on processor 510, such as one or more of the functions and/or modules discussed herein. It should be understood that programs stored in the memory and executed by processor 510 may be written and/or compiled according to any suitable language, including without limitation C/C++, Java, JavaScript, Perl, Visual Basic, .NET, and the like. Main memory 515 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 520 may optionally include an internal medium 525 and/or a removable medium 530. Removable medium 530 is read from and/or written to in any well-known manner. Removable storage medium 530 may be, for example, a magnetic tape drive, a compact disc (CD) drive, a digital versatile disc (DVD) drive, other optical drive, a flash memory drive, and/or the like.

Secondary memory 520 is a non-transitory computer-readable medium having computer-executable code (e.g., disclosed software modules) and/or other data stored thereon. The computer software or data stored on secondary memory 520 is read into main memory 515 for execution by processor 510.

In alternative embodiments, secondary memory 520 may include other similar means for allowing computer programs or other data or instructions to be loaded into system 500. Such means may include, for example, a communication interface 540, which allows software and data to be transferred from external storage medium 545 to system 500. Examples of external storage medium 545 may include an external hard disk drive, an external optical drive, an external magneto-optical drive, and/or the like. Other examples of secondary memory 520 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 500 may include a communication interface 540. Communication interface 540 allows software and data to be transferred between system 500 and external devices (e.g. printers), networks, or other information sources. For example, computer software or executable code may be transferred to system 500 from a network server via communication interface 540. Examples of communication interface 540 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 500 with a network or another computing device. Communication interface 540 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 540 are generally in the form of electrical communication signals 555. These signals 555 may be provided to communication interface 540 via a communication channel 550. In an embodiment, communication channel 550 may be a wired or wireless network, or any variety of other communication links. Communication channel 550 carries signals 555 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed mobile application, or software modules) is stored in main memory 515 and/or secondary memory 520. Computer programs can also be received via communication interface 540 and stored in main memory 515 and/or secondary memory 520. Such computer programs, when executed, enable system 500 to perform the various functions of the disclosed embodiments as described elsewhere herein.

In this description, the term "computer-readable medium" is used to refer to any non-transitory computer-readable storage media used to provide computer-executable code and/or other data to or within system 500. Examples of such media include main memory 515, secondary memory 520 (including internal memory 525, removable medium 530, and external storage medium 545), and any peripheral device communicatively coupled with communication interface 540 (including a network information server or other network device). These non-transitory computer-readable media are means for providing executable code, programming instructions, software, and/or other data to system 500.

In an embodiment that is implemented using software, the software may be stored on a computer-readable medium and loaded into system 500 by way of removable medium 530, I/O interface 535, or communication interface 540. In such an embodiment, the software is loaded into system 500 in the form of electrical communication signals 555. The software, when executed by processor 510, preferably causes processor 510 to perform one or more of the processes and functions described elsewhere herein.

In an embodiment, I/O interface 535 provides an interface between one or more components of system 500 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 500 may also include optional wireless communication components that facilitate wireless communication over a voice network and/or a data network (e.g., in the case of mobile device 100). The wireless communication components comprise an antenna system 570, a radio system 565, and a baseband system 560. In system 500, radio frequency (RF) signals are transmitted and received over the air by antenna system 570 under the management of radio system 565.

In an embodiment, antenna system 570 may comprise one or more antennae and one or more multiplexors (not shown) that perform a switching function to provide antenna system 570 with transmit and receive signal paths. In the receive path, received RF signals can be coupled from a multiplexor to a low noise amplifier (not shown) that amplifies the received RF signal and sends the amplified signal to radio system 565.

In an alternative embodiment, radio system 565 may comprise one or more radios that are configured to communicate over various frequencies. In an embodiment, radio system 565 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 565 to baseband system 560.

If the received signal contains audio information, then baseband system 560 decodes the signal and converts it to an analog signal. Then the signal is amplified and sent to a speaker. Baseband system 560 also receives analog audio signals from a microphone. These analog audio signals are converted to digital signals and encoded by baseband system 560. Baseband system 560 also encodes the digital signals for transmission and generates a baseband transmit audio signal that is routed to the modulator portion of radio system 565. The modulator mixes the baseband transmit audio signal with an RF carrier signal, generating an RF transmit signal that is routed to antenna system 570 and may pass through a power amplifier (not shown). The power amplifier amplifies the RF transmit signal and routes it to antenna system 570, where the signal is switched to the antenna port for transmission.

Baseband system 560 is also communicatively coupled with processor 510, which may be a central processing unit (CPU). Processor 510 has access to data storage areas 515 and 520. Processor 510 is preferably configured to execute instructions (i.e., computer programs, such as the disclosed mobile application, or software modules) that can be stored in main memory 515 or secondary memory 520. Computer programs can also be received from baseband processor 560 and stored in main memory 510 or in secondary memory 520, or executed upon receipt. Such computer programs, when executed, enable system 500 to perform the various functions of the disclosed embodiments.

5. Hardware Input

Figure 6A:
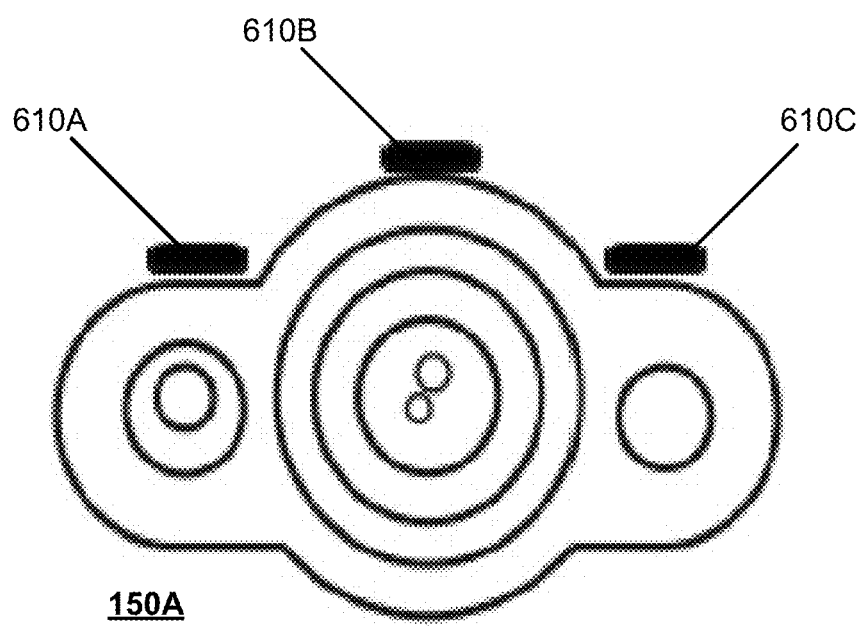
FIGS. 6A and 6B illustrate a detachable mini-camera, according to embodiments.
Figure 6B:
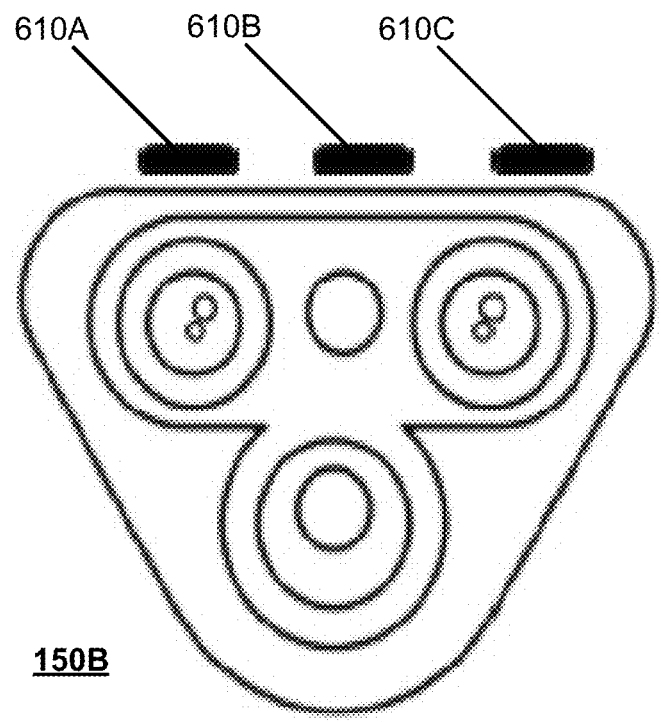

FIGS. 6A and 6B illustrate embodiments of detachable mini-cameras 150A and 150B, respectively, with hardware keys, according to an embodiment. Specifically, each detachable mini-camera 150 may comprise one or more hardware keys 610. Each hardware key 610 may be associated with a function of detachable mini-camera 150. In the illustrated embodiment, detachable mini-camera 150 comprises three hardware keys 610A-610C.

However, in alternative embodiments, detachable mini-camera 150 may comprise any number of hardware keys 610, such as one hardware key 610, two hardware keys 610, four hardware keys 610, and so on and so forth.

In the illustrated embodiment, each hardware key 610 comprises a button on a top side surface of detachable mini-camera 150. However, in alternative embodiments, hardware key(s) 610 may be positioned on the left side surface, right side surface, and/or bottom side surface. As yet another alternative, hardware key(s) 610 may be positioned on a front surface (i.e., the surface comprising camera(s) 154) or rear surface (i.e., opposite the front surface and comprising the attachment component for attaching to socket 110) of detachable mini-camera 150. In an embodiment with a plurality of hardware keys 610, different hardware keys 610 may be positioned on different surfaces of detachable mini-camera 150. For example, a first hardware key 610A may be positioned on a first side surface, while a second hardware key 610B is positioned on a second side surface that is different than the first side surface. As another example, a first hardware key 610A may be positioned on a first side surface, while a second hardware key 610B is positioned on the front or rear surface. Alternatively, as illustrated in FIGS. 6A and 6B, all of hardware keys 610 may be positioned on the same surface (e.g., top side surface) of detachable mini-camera 150.

In an embodiment with a plurality of hardware keys 610, each of the plurality of hardware keys 610 may activate a different function of detachable mini-camera 150. For example, hardware key 610A may perform a zoom-in function (e.g., mechanical or electronic zoom) of camera 154. In other words, activation of hardware key 610A (e.g., by pressing hardware key 610A in an embodiment in which hardware key 610A is a button) may cause a processor 510 in detachable mini-camera 150 to control camera 154 to increase magnification. Conversely, hardware key 610C may perform a zoom-out function (e.g., mechanical or electronic zoom) of camera 154. In other words, activation of hardware key 610C (e.g., by pressing hardware key 610C in an embodiment in which hardware key 610C is a button) may cause a processor 510 in detachable mini-camera 150 to control camera 154 to decrease magnification.

As another example, hardware key 610B may toggle the recording function of camera 154. For example, if camera 154 is not currently recording a video, activation of hardware key 610B (e.g., by pressing hardware key 610B in an embodiment in which hardware key 610B is a button) may cause a processor 510 in detachable mini-camera 150 to control camera 154 to begin recording a video, for example, by capturing image frames and transmitting those image frames to mobile device 100, as discussed elsewhere herein. Conversely, if camera 154 is currently recording a video, activation of hardware key 610B may cause the processor 510 in detachable mini-camera 150 to control camera 154 to stop recording the video, for example, by terminating capture of the image frames and transmitting an indication that recording has been stopped to mobile device 100.

It should be understood that hardware key(s) 610 may be associated with more, fewer, or different functions than those described herein. Examples of additional functions include, without limitation, activation/deactivation of sensor 156 and/or flash 158, capturing a still image, powering detachable mini-camera 150 on and/or off, activation/deactivation of object tracking, and/or the like. It should also be understood that hardware key(s) 610 may be implemented as any type of actuator. Examples of possible actuators include, without limitation, buttons, switches, joysticks, capacitive or other touch sensors, and/or the like.

It should be understood that detachable mini-camera 150 may be operated by a user using the hardware key(s) 610 and/or the disclosed mobile application. In other words, the user could still operate detachable mini-camera 150 using the mobile application, as described elsewhere herein, while hardware key(s) 610 represent an alternative manner by which the user may operate detachable mini-camera 150. For example, the user could turn video recording on or off using the mobile application or hardware key 610B, depending on whichever is more convenient to the user in the moment. This may be the case even if detachable mini-camera 150 is attached to socket 110. Alternatively, hardware key(s) 610 may be automatically deactivated when detachable mini-camera 150 is attached to socket 110 (e.g., in order to prevent inadvertent operation of hardware key(s) 610).

In an embodiment, detachable mini-camera 150 may comprise a touch panel display (e.g., LCD, LED, etc., with capacitive touch sensing) in addition to or instead of hardware key(s) 610. For example, a touch panel display may be provided on the rear surface of detachable mini-camera 150 (i.e., opposite camera(s) 154). Thus, a user could utilize detachable mini-camera 150 as a stand-alone camera that automatically streams image data to mobile device 100. Processor(s) 510 of detachable mini-camera 150 may generate and display an interactive graphical user interface on the touch panel display. Thus, the user may control detachable mini-camera 150 via touch operations to one or more inputs in the graphical user interface being displayed on touch panel display. The graphical user interface may be identical, similar, or different than the graphical user interface described elsewhere herein. In one embodiment, detachable mini-camera 150 may store and execute the disclosed mobile application, or a lighter-weight version of the disclosed mobile application (e.g., fewer features, such as fewer inputs and/or functions, lower resolution, etc.), to generate the graphical user interface and control the camera(s) 154. To minimize power consumption, processor(s) 510 of detachable mini-camera 150 may automatically turn off the touch panel display whenever attachment to socket 110 is detected, after a predetermined period of inactivity (e.g., 5 minutes, 10 minutes, 15 minutes, etc.), and/or whenever a user activates a particular hardware key 610. Conversely, processor(s) 510 may automatically turn on the touch panel display whenever detachment from socket 110 is detected and/or a user contacts touch panel display, activates a particular hardware key 610, and/or activates any hardware key 610.

6. Transfer Between Devices

Figure 7A:
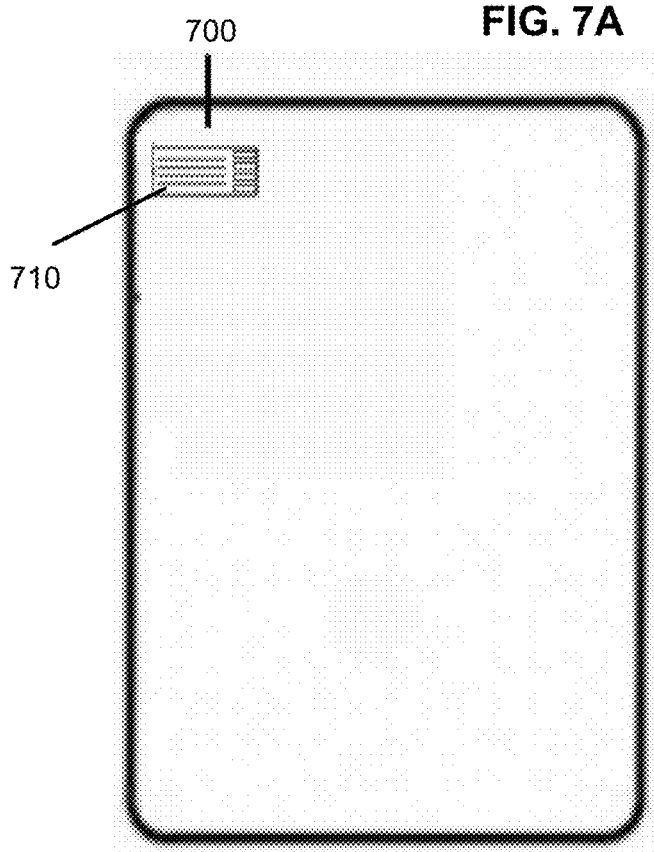
Figure 7B:
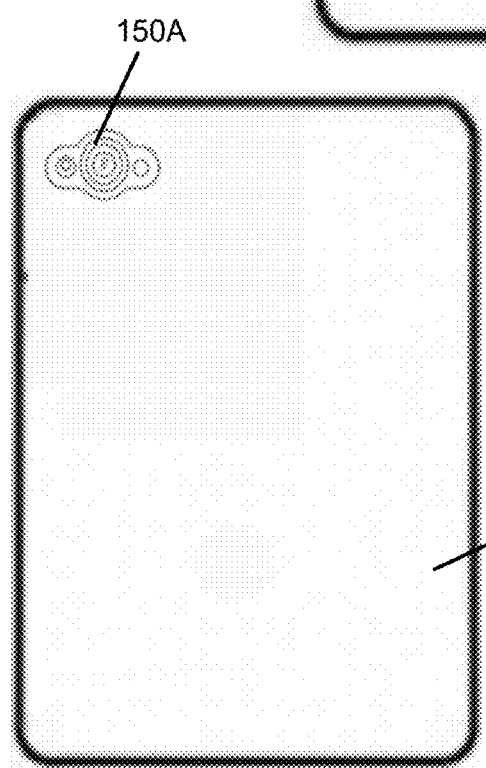
Figure 7C:
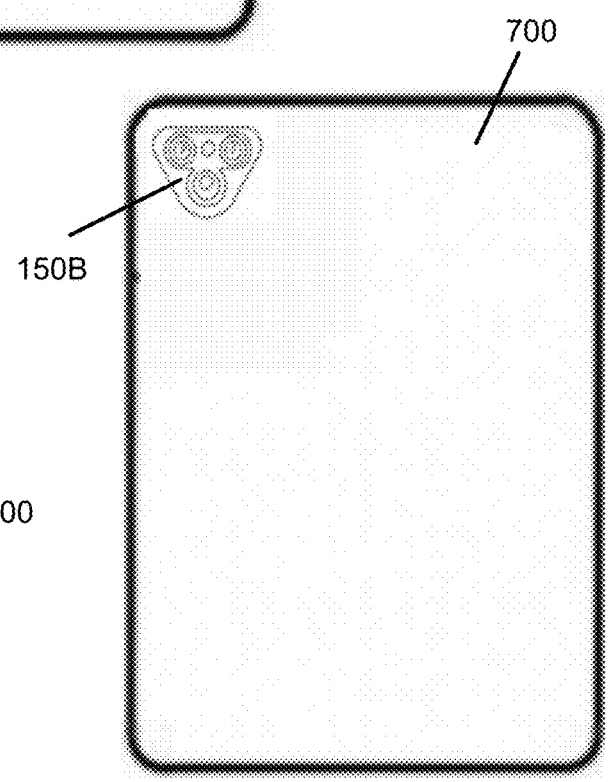

FIG. 7A illustrates another device 700 with a socket 710, according to an embodiment. For example, device 700 may be a tablet computer. In a preferred embodiment, socket 710 is identical to socket 110 in mobile device 100. Alternatively, socket 710 could be similar (e.g., using at least an identical attachment mechanism), but not identical, or even different than socket 110 (e.g., using different, but compatible, attachment mechanisms). In any case, all of the disclosure related to socket 110 may be applied equally to socket 710, and all of the disclosure related to mobile device 100 may be applied equally to device 700, which may store and execute the same or similar mobile application as mobile device 100. FIGS. 7B and 7C illustrate attachment of detachable mini-cameras 150A and 150B, respectively, to socket 710 of device 700, according to embodiments.

In an embodiment in which sockets 110 and 710 comprise the same attachment mechanism, detachable mini-camera 150, which may be an embodiment with or without hardware key(s) 610, may be transferred between devices 100 and 700. For example, detachable mini-camera 150 may be detached from socket 110 on mobile device 100 and attached to socket 710 on device 700, and may be detached from socket 710 on device 700 and attached to socket 110 on mobile device 100. Sockets 110 and 710 may be similarly compatible across a plurality of mobile devices 100 and/or a plurality of devices 700, such that any given detachable mini-camera 150 may be transferred between different mobile devices 100, between different devices 700, and between each mobile device 100 and each device 700.

Whenever detachable mini-camera 150 is attached to a socket 110 or 710, detachable mini-camera 150 may receive power from the device 100 or 700, respectively. This may be the case even if detachable mini-camera 150 is not the original detachable mini-camera 150 with which the device 100 or 700 was manufactured or purchased. Thus, the rechargeable battery of detachable mini-camera 150 may be recharged from the power source of whatever device to which detachable mini-camera 150 is attached via the respective socket 110 or 710.

Additionally or alternatively, whenever detachable mini-camera 150 is attached to a socket 110 or 710, detachable mini-camera 150 may automatically register or pair with the device 100 or 700, respectively, such that detachable mini-camera 150 can be controlled by a mobile application executing on the device 100 or 700 to which detachable mini-camera 150 is attached and/or transmit image data to the device 100 or 700 to which detachable mini-camera 150 is attached. Alternatively, the pairing may be semi-automatic (e.g., merely requiring confirmation by a user of the device 100 or 700 to which detachable mini-camera 150 is attached and/or by a user of the device 100 or 700 to which detachable mini-camera 150 was previously attached). As another alternative, the pairing may be manual (e.g., requiring the user to perform the pairing via one or more inputs, using any known pairing techniques).

Thus, detachable mini-camera 150 can be easily transferred between devices 100 and/or 700. In this manner, a user could easily switch out a detachable mini-camera 150 from his or her device 100 or 700 for another detachable mini-camera 150 and/or replace a lost or damaged detachable mini-camera 150. For example, a user who wants to upgrade the camera on their device 100 or 700 may purchase an improved camera (e.g., higher resolution and/or image quality, higher zoom level, improved or additional features, etc.) as detachable mini-camera 150, remove the old detachable mini-camera 150, and attach the new and improved detachable mini-camera 150. In other words, unlike conventional systems in which a user must purchase an entirely new device to upgrade the camera of the device, in an embodiment that uses detachable mini-camera 150, a user may easily upgrade the camera on his or her existing device without having to purchase an entirely new device by simply switching out the old detachable mini-camera 150 for a new detachable mini-camera 150. As another example, a user may purchase a plurality of detachable mini-cameras 150 having different characteristics (e.g., non-overlapping sets of features, different zoom levels, etc.), and swap them in and out of one or a plurality of devices 100 and/or 700, as needed or desired for a particular recording scenario or environment. As yet another example, users may switch out or trade detachable mini-cameras 150 from their devices as desired, for example, to obtain a decorated detachable mini-camera 150 with ornamental features (e.g., that are more aesthetically pleasing to the user). It should be understood that these represent only a few examples, and that there are many other scenarios in which it may be advantageous to switch out a detachable mini-camera 150 from a device 100 or 700.

When a detachable mini-camera 150 is paired with a first device 100 or 700 (e.g., being controlled by and/or streaming image data to that device) and is attached to a socket of a second device 100 or 700, there are a number of ways in which the pairing may be handled, depending on the design goals of the system. In each case, the attachment to the socket of the device may be automatically detected by the second device and/or the first device (e.g., using a detection sensor as discussed elsewhere herein):

In an embodiment, when attachment is detected, detachable mini-camera 150 may be automatically unpaired from the first device, and automatically paired to the second device.

In an embodiment, when attachment is detected, the first device may automatically prompt a user of the first device to unpair from detachable mini-camera 150, and, upon receiving confirmation from the user of the first device, automatically un-pair detachable mini-camera 150 from the first device and automatically pair detachable mini-camera 150 to the second device.

In an embodiment, when attachment is detected, the second device may automatically prompt a user of the second device to pair to detachable mini-camera 150, and, upon receiving confirmation from the user of the second device, automatically un-pair detachable mini-camera 150 from the first device and automatically pair detachable mini-camera 150 to the second device.

In an embodiment, when attachment is detected, the first device may automatically prompt a user of the first device to unpair from detachable mini-camera 150, and, upon receiving confirmation from the user of the first device, automatically un-pair detachable mini-camera 150 from the first device, and the second device may automatically prompt a user of the second device to pair to detachable mini-camera 150, and, upon receiving confirmation from the user of the second device, automatically pair detachable mini-camera 150 to the second device.

In an embodiment, when attachment is detected, detachable mini-camera 150 may remain paired to the first device, and only receive power from the second device. In this case, detachable mini-camera 150 is still controlled by the first device (e.g., via the mobile application) and transmits image data to the first device, but is recharged by the second device. However, in an embodiment in which detachable mini-camera 150 comprises hardware key(s) 610 and hardware key(s) 610 remain functional even when detachable mini-camera 150 is connected, the user of the second device may control detachable mini-camera 150 via hardware key(s) 610.

In an embodiment, when attachment is detected, detachable mini-camera 150 may remain paired to the first device, and automatically pair to the second device, such that it is paired to both devices. In this case, detachable mini-camera 150 may be controlled by both the first device and the second device and/or transmit image data to both the first device and the second device.

FIG. 8A illustrates an action camera 800 with a socket 810, according to an embodiment, and FIGS. 8B and 8C illustrate attachment of detachable mini-cameras 150A and 150B, respectively, to socket 810 of device 800, according to embodiments. It should be understood that action camera 800 is simply a specific example of a device to which detachable mini-camera 150 can be attached. Thus, everything described with respect to devices 100 and 700 may be applied equally to action camera 800.

Action camera 800 may comprise socket 810, which may be identical or similar (e.g., compatible attachment mechanism) to socket 110 and/or socket 710. In such an embodiment, action camera 800 may only comprise a base of a typical action camera without any camera or other optical components. In such a case, the base may be configured to be mounted (e.g., on a helmet, surfboard, snowboard, skis, kayak, vehicle, etc.) as a typical action camera. This base may comprise a rechargeable battery that can provide power to a detachable mini-camera 150 that is attached to socket 810. Alternatively, the base may comprise no rechargeable battery (and any other electronic components), in which case socket 810 may comprise a compatible attachment mechanism but no electrical traces, such that detachable mini-camera 150 may be attached to the base, but will not be recharged by the base. In either case, in an embodiment in which the base does not comprise any optical components, it should be understood that action camera 800 does not actually function as a camera unless a detachable mini-camera 150 is attached to socket 810. When functioning as a camera, detachable mini-camera 150 may transmit image data to a paired mobile device 100. In addition, detachable mini-camera 150 may be controlled by the paired mobile device 100 (e.g., via the disclosed mobile application) and, in an embodiment with hardware key(s) 610, by hardware key(s) 610 on detachable mini-camera 150. In an embodiment, in which action camera 800 does comprise electronic components, detachable mini-camera 150 could also be controlled via a user interface of action camera 800 (e.g., virtual controls on a touch screen interface, hardware keys, etc.).

Alternatively, action camera 800 could be a full imaging system with an independently operable camera. Examples of such action cameras include, without limitation, the HERO™ series of cameras produced by GoPro, Inc. of San Mateo, Calif., the Osmo Action™ series of cameras produced by SZ DJI Technology Co., Ltd. of Shenzhen, Guangdong, China, the RXO Mark II™ produced by Sony Corp. of Tokyo, Japan, and/or the like. In this case, detachable mini-camera 150 could be attached to a socket 810 over the independently operable camera, thereby obscuring the independently operable camera, or at a position separate from the independently operable camera, such that the independently operable camera and detachable mini-camera 150 may capture image data independently and simultaneously. In this case, detachable mini-camera 150 may receive power from action camera 800, but be controlled by the paired mobile device 100 and/or transmit image data to the paired mobile device 100, instead of action camera 800.

In an alternative embodiment, action camera 800 may not comprise a socket 810 that supplies power. In this case, detachable mini-camera 150 may be attached to action camera 800 by some other means (e.g., magnet, Velcro™, temporary adhesive, etc.), and rely on the internal rechargeable battery of detachable mini-camera 150 for power. Effectively, detachable mini-camera 150 would simply be using action camera 800 as a mount for image capture.

As an example of the usage of detachable mini-camera 150 with action camera 800, a user could detach detachable mini-camera 150 from a paired device 100 or 700, and attach detachable mini-camera 150 to socket 810 on action camera 800. Action camera 800 may be mounted on a helmet worn by the same user or a different user or on a recreational vehicle (e.g., surfboard, snowboard, skis, kayak, bicycle, automobile, etc.) ridden or driven by the same user or a different user. As action camera 800 moves through an action scenario (e.g., a ride, drive, run, etc.), detachable mini-camera 150 may be controlled by the paired device 100 or 700 and stream image data to the paired device 100 or 700 (e.g., to be stored in memory on the paired device 100 or 700) or through the paired device 100 or 700 (e.g., relayed as a live stream to a streaming platform). It should be understood that the paired device 100 or 700 may be controlled by a first user, while a second, different user controls action camera 800 (e.g., via the second user's control of the helmet/vehicle to which action camera 800 is mounted). Thus, as the second user controls action camera 800 through the action scenario, the first user may control the functions of detachable mini-camera 150, thereby freeing the second user to focus on the action scenario. However, it should be understood that, in an embodiment in which detachable mini-camera 150 comprises hardware key(s) 610, the second user may control detachable mini-camera 150 using hardware key(s) 610. In this case, if conflicting control commands are simultaneously received by detachable mini-camera 150 from the first user and the second user, the conflict may be resolved in any conventional manner (e.g., rejecting the control command from the second user, rejecting the control command from the first user, rejecting both control commands from the first and second users, executing the control command from the first user and then executing the control command from the second user, executing the control command from the second user and then executing the control command from the first user, prompting the first user with an indication of the conflict and prompting the first user to confirm the control command from the first user or select whether to accept the control command from the first user or the control command from the second user, etc.).

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A system comprising:
    an image-capture device comprising
        a connector configured to attach to a socket and detach from the socket on a plurality of devices, wherein the plurality of devices comprises a first device to which the image-capture device is initially paired and a second device,
        a rechargeable battery configured to charge from each of the plurality of devices when the connector is attached to the socket of that device,
        a wireless transceiver configured to wirelessly communicate with the first device when the connector is detached from the socket of the first device,
        a camera configured to capture image data, and
        at least one processor that is configured to
            wirelessly transmit image data, captured by the camera, to the first device via the wireless transceiver, while the connector is attached to the socket of the second device and not the socket of the first device and while the image-capture device is paired to the first device, and
            automatically pair to each of the plurality of devices when the connector is attached to the socket of that device; and
    the second device, wherein the second device comprises
        a sensor that detects when the connector of the image-capture device is attached to the socket of the second device, and
        at least one processor that is configured to automatically initiate pairing of the image-capture device to the second device when the sensor detects that the connector of the image-capture device is attached to the socket of the second device.

2. The system of claim 1, wherein the first device is a mobile device.

3. The system of claim 2, wherein the second device is a mobile device.

4. The system of claim 3, wherein the first device is a smartphone.

5. The system of claim 4, wherein the second device is a tablet computer.

6. The system of claim 4, wherein the second device is an action camera.

7. The system of claim 1, wherein the second device comprises a housing that is configured to be mounted on a third-party apparatus, and wherein the second device does not comprise a camera.

8. The system of claim 7, wherein the second device comprises another rechargeable battery, which is configured to charge the rechargeable battery of the image-capture device when the connector of the image-capture device is attached to the socket of the second device.

9. The system of claim 7, wherein the third-party apparatus is a helmet.

10. The system of claim 7, wherein the third-party apparatus is a recreational vehicle.

11. The system of claim 1, wherein the image-capture device further comprises:
    a housing that holds the connector, the rechargeable battery, the wireless transceiver, the camera, and the at least one processor; and
    one or more hardware keys on an exterior surface of the housing, wherein each of the one or more hardware keys is associated with a function.

12. The system of claim 11, wherein a first one of the one or more hardware keys, when actuated, toggles the capture of the image data by the camera between on and off states.

13. The system of claim 12, wherein the one or more hardware keys are a plurality of hardware keys.

14. The system of claim 13, wherein a second one of the plurality of hardware keys, when actuated, controls a zoom level of the camera.

15. The system of claim 14, wherein the second hardware key, when actuated, increases the zoom level of the camera, and wherein a third one of the plurality of hardware keys, when actuated, decreases the zoom level of the camera.

16. The system of claim 1, wherein the second device further comprises a display, and wherein initiating pairing comprises prompting a user to confirm the pairing via a graphical user interface on the display of the second device.

17. The system of claim 1, wherein pairing comprises establishing a communication connection between the image-capture device and the second device, such that one or more functions of the image-capture device can be controlled via a mobile application being executed by the at least one processor of the second device.

18. The system of claim 1, wherein pairing comprises establishing a communication connection between the image-capture device and the second device, such that image data, captured by the camera of the image-capture device, can be sent to a mobile application being executed by the at least one processor of the second device.

* * * * *